United States Patent
Maruyama et al.

(10) Patent No.: US 9,042,030 B2
(45) Date of Patent: May 26, 2015

(54) ZOOM LENS AND IMAGING APPARATUS

(71) Applicant: Sony Corporation, Tokyo (JP)

(72) Inventors: Masaki Maruyama, Chiba (JP); Masaharu Hosoi, Kanagawa (JP); Hiroshi Koizumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/472,672

(22) Filed: Aug. 29, 2014

(65) Prior Publication Data

US 2015/0085165 A1 Mar. 26, 2015

(30) Foreign Application Priority Data

Sep. 25, 2013 (JP) ................................. 2013-198806

(51) Int. Cl.
*G02B 15/14* (2006.01)
*G02B 13/18* (2006.01)
*H04N 5/232* (2006.01)

(52) U.S. Cl.
CPC ............ *H04N 5/23296* (2013.01); *G02B 15/14* (2013.01); *G02B 13/18* (2013.01)

(58) Field of Classification Search
CPC .... G02B 15/173; G02B 15/14; G02B 13/009; G02B 27/646; G02B 13/18; G02B 15/16
USPC ................................ 359/676, 683
See application file for complete search history.

(56) References Cited

U.S. PATENT DOCUMENTS

2014/0347525 A1* 11/2014 Obikane .................... 348/240.3

FOREIGN PATENT DOCUMENTS

| JP | 01-252915 | 10/1989 |
| JP | 2009-175324 | 8/2009 |
| JP | 2009-244445 | 10/2009 |

* cited by examiner

*Primary Examiner* — Scott J Sugarman
(74) *Attorney, Agent, or Firm* — Fishman Stewart Yamaguchi PLLC

(57) ABSTRACT

A zoom lens includes, in order from an object side to an image side: a first lens group having a positive refractive power; a second lens group having a negative refractive power; a third lens group having a positive refractive power; a fourth lens group having a negative refractive power; and a fifth lens group having a negative refractive power. During zooming from a wide-angle end state to a telephoto end state, air spacing between the first and second lens groups increases, air spacing between the second and third lens groups decreases, spacing between the third and fourth lens groups changes, and spacing between the fourth and fifth lens groups changes. Thus, all the lens groups are moved in an optical axis direction. The zoom lens satisfies the following Conditional Expression (1).

$$1.0 < \beta 5w \leq 4.0 \qquad (1)$$

Here, $\beta 5w$ is a lateral magnification of the fifth lens group at a wide-angle end.

11 Claims, 19 Drawing Sheets

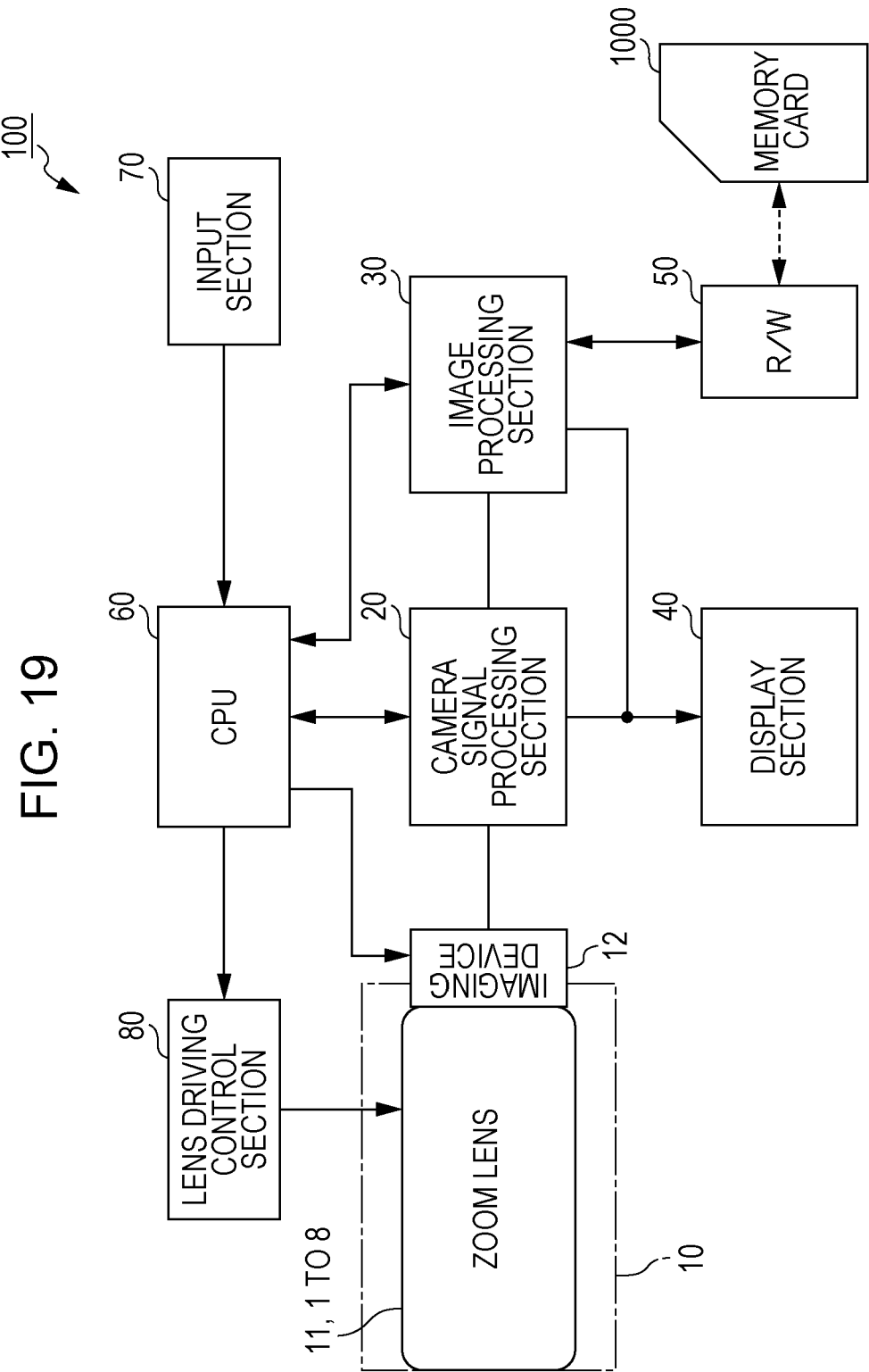

ZOOM LENS AND IMAGING APPARATUS

CROSS REFERENCE TO RELATED APPLICATIONS

This application claims the benefit of Japanese Priority Patent Application JP 2013-198806 filed Sep. 25, 2013, the entire contents of which are incorporated herein by reference.

BACKGROUND

The present technology relates to a zoom lens and an imaging apparatus. The zoom lens has a configuration of five groups which are arranged to have positive, negative, positive, negative, and negative refractive powers in order from the object side to the image side.

In known methods in the past, an imaging device using a photoelectric conversion element such as a charge coupled device (CCD) or a complementary metal-oxide semiconductor (CMOS) is used as recording means in an imaging apparatus such as a camera, and a subject image, which is formed on a surface of the imaging device, is converted into an electrical output by the photoelectric conversion elements, and is recorded.

Further, in accordance with advancement in a recent microfabrication technology, a speed of a central processing unit (CPU) increases, high integration of a storage medium advances, and thus it is possible to process a large volume of image data at a high speed. Meanwhile, even a light receiving element is also reduced in size and more highly integrated, and is thus able to perform recording of a higher spatial frequency. In accordance with reduction in size, it is possible to reduce a size of the entirety of a camera.

In contrast, recently, an imaging apparatus, which has no mirror box in a camera main body, referred to as a mirrorless camera system that has spread remarkably, normally employs a short flange back with a width larger than that of the existing single-lens reflex camera system. Thus, the camera main body is designed to have a smaller size.

Due to such a background, for an interchangeable lens of a recent interchangeable lens digital camera system, there is a high demand to achieve high imaging performance according to a high spatial frequency of the light receiving element, and there is a high demand to reduce the size of a lens according to reduction in the size of the camera.

In the recent interchangeable lens digital camera system, there is a demand for a lightweight focus lens group capable of capturing a moving image and performing focusing at a high speed appropriate for tracking of a subject during the capturing of the moving image.

A recent zoom lens used in the interchangeable lens of the interchangeable lens camera is mostly a zoom lens using multiple lens groups in which three or more lens groups are movable. Generally, the zoom lens using multiple lens groups has a high degree of freedom of the change in the relative position caused by zooming of the lens groups, and it is advantageous to correct aberrations. Further, by distributing the zooming operation among the lens groups, the zoom lens also has an advantage in that it is easy to achieve an increase in the magnification and minimize the shift lengths of the lens groups during zooming.

Examples of the zoom lens using multiple lens groups include zoom lenses having a configuration of five groups described in Japanese Unexamined Patent Application Publication No. 2009-175324 and Japanese Unexamined Patent Application Publication No. 2009-244445.

The zoom lenses described in Japanese Unexamined Patent Application Publication No. 2009-175324 and Japanese Unexamined Patent Application Publication No. 2009-244445 include, in order from the object side to the image side: a first lens group that has a positive refractive power; a second lens group that has a negative refractive power; a third lens group that has a positive refractive power; a fourth lens group that has a negative refractive power; and a fifth lens group that has a positive refractive power.

SUMMARY

However, as in the zoom lenses described in Japanese Unexamined Patent Application Publication No. 2009-175324 and Japanese Unexamined Patent Application Publication No. 2009-244445, a fifth lens group, which is a final lens group of an optical system, is formed as a lens group having a positive refractive power. In such a case, an exit pupil is separated from an image plane, and the diameter of the fifth lens group and the diameter of the entire optical system increase. Generally, in the interchangeable lens, a mechanism such as a substrate or mount is disposed on the rear side of the barrel in which the final lens group is disposed. Thus, as the lens diameter of the final lens group increases, the size of the barrel increases.

In such a case, it may be possible to decrease the lens diameter of the final lens group by increasing the back focal length of the optical system in accordance with the distance of the exit pupil. However, when the back focal length is increased, it becomes difficult to decrease the total length in the optical axis direction. As a result, it becomes difficult to decrease the size of the zoom lens.

As described above, in the zoom lens of the type described in Japanese Unexamined Patent Application Publication No. 2009-175324 and Japanese Unexamined Patent Application Publication No. 2009-244445, in particular, such a configuration causes a problem in the design of an optical system compatible with a large-size imaging device while using a small-size barrel like a mirrorless interchangeable lens system.

Since the diameter of the entire optical system increases, the weight of the focus lens groups increases, and thus there is a problem in that the zoom lens is not appropriate for an increase in the speed of focusing.

Meanwhile, the fifth lens group has a negative refractive power, and thus there is a zoom lens including groups having positive, negative, positive, negative, and negative powers in order from the object side to the image side (for example, refer to Example 7 in Japanese Unexamined Patent Application Publication No. 1-252915).

However, in the zoom lens shown in Example 7 of Japanese Unexamined Patent Application Publication No. 1-252915, the negative refractive power of the fifth lens group is weak, and it is difficult to use an imaging device having a sufficiently large size while achieving reduction in the size.

Consequently, it is desired that the zoom lens and the imaging apparatus according to the present technology be compatible with large-size imaging devices while having small sizes and be capable of performing focusing at a high speed appropriate for capturing a moving image while achieving high imaging performance.

According to a first embodiment of the present technology, there is provided a zoom lens including, in order from an object side to an image side: a first lens group that has a positive refractive power; a second lens group that has a negative refractive power; a third lens group that has a positive refractive power; a fourth lens group that has a negative refractive power; and a fifth lens group that has a negative refractive power. During zooming from a wide-angle end state in which a focal length is shortest to a telephoto end state in which a focal length is longest, all the lens groups are moved in an optical axis direction such that air spacing between the first lens group and the second lens group increases, air spacing between the second lens group and the third lens group decreases, spacing between the third lens group and the fourth lens group changes, and spacing between the fourth lens group and the fifth lens group changes. The zoom lens satisfies the following Conditional Expression (1).

$$1.0 < \beta 5w \leq 4.0, \quad (1)$$

where $\beta 5w$ is a lateral magnification of the fifth lens group at a wide-angle end.

Thereby, the negative refractive power of the fifth lens group raises heights of off-axis rays transmitted through the fifth lens group up to a high image height. Further, when Conditional Expression (1) is satisfied, an angle of incidence of exit light of the optical system incident onto an image plane decreases.

According to a second embodiment of the present technology, in the zoom lens, it is preferable that the fourth lens group satisfy the following Conditional Expression (2).

$$0.7 < (R4f+R4r)/(R4f-R4r) \leq 3.0, \quad (2)$$

where $R4f$ is a radius of curvature of a surface of the fourth lens group closest to the object side, and $R4r$ is a radius of curvature of a surface of the fourth lens group closest to the image side.

Thereby, the surface closest to the object side and the surface closest to the image side in the fourth lens group are not formed as concave surfaces of which the curvature is excessively large. Hence, an angle of incidence of off-axis marginal rays passing through the surfaces does not increase.

According to a third embodiment of the present technology, in the zoom lens, it is preferable that the fourth lens group be moved in the optical axis direction so as to correct a change in an image formation position caused by a change in an object distance.

Thereby, the fourth lens group, which decreases the diameter of rays and is not exposed to the outside, functions as a focus lens group.

According to a fourth embodiment of the present technology, in the zoom lens, it is preferable that the fourth lens group be formed of one negative lens or one cemented lens.

Thereby, the weight of the fourth lens group is reduced.

According to a fifth embodiment of the present technology, in the zoom lens, it is preferable that the third lens group and the fifth lens group be integrally moved in the optical axis direction during zooming.

Thereby, a structure of the zoom lens is simplified.

According to a sixth embodiment of the present technology, in the zoom lens, it is preferable that the fourth lens group have at least one aspheric surface.

Thereby, using a small number of the lenses, aberration variation caused by focusing is suppressed.

According to a seventh embodiment of the present technology, in the zoom lens, it is preferable that the third lens group be formed of a plurality of lenses and some lenses of the third lens group be moved in a direction perpendicular to the optical axis direction so as to correct image blur.

Thereby, the diameter and the weight of the group for blur correction are reduced.

According to an eighth embodiment of the present technology, in the zoom lens, it is preferable that some lenses of the third lens group, which are moved in the direction perpendicular to the optical axis direction, have at least one aspheric surface.

Thereby, when the corresponding lenses are moved in the direction perpendicular to the optical axis direction at the time of blur correction, the surfaces of the lenses can be made to have such shapes as compensate changes in angles of incidence onto the surfaces in the group for blur correction.

There is provided an imaging apparatus including: a zoom lens; and an imaging device that converts an optical image, which is formed by the zoom lens, into an electric signal. The zoom lens includes, in order from an object side, a first lens group that has a positive refractive power, a second lens group that has a negative refractive power, a third lens group that has a positive refractive power, a fourth lens group that has a negative refractive power, and a fifth lens group that has a negative refractive power. During zooming from a wide-angle end state in which a focal length is shortest to a telephoto end state in which a focal length is longest, all the lens groups are moved in an optical axis direction such that air spacing between the first lens group and the second lens group increases, air spacing between the second lens group and the third lens group decreases, spacing between the third lens group and the fourth lens group changes, and spacing between the fourth lens group and the fifth lens group changes. The zoom lens satisfies the following Conditional Expression (1).

$$1.0 < \beta 5w \leq 4.0, \quad (1)$$

where $\beta 5w$ is a lateral magnification of the fifth lens group at a wide-angle end.

Thereby, in the zoom lens, the negative refractive power of the fifth lens group raises heights of off-axis rays transmitted through the fifth lens group up to the high image height. Further, when Conditional Expression (1) is satisfied, an angle of incidence of exit light of the optical system incident onto an image plane decreases.

There is different zoom lens including, in order from an object side to an image side: a first lens group that has a positive refractive power; a second lens group that has a negative refractive power; a third lens group that has a positive refractive power; a fourth lens group that has a negative refractive power; and a fifth lens group that has a negative refractive power. During zooming from a wide-angle end state in which a focal length is shortest to a telephoto end state in which a focal length is longest, the lens groups are moved in an optical axis direction such that air spacing between the first lens group and the second lens group increases, air spacing between the second lens group and the third lens group decreases, and spacing between the third lens group and the fourth lens group changes. The zoom lens satisfies the following Conditional Expression (3).

$$1.018 < \beta 5w \leq 4.0, \quad (3)$$

where $\beta 5w$ is a lateral magnification of the fifth lens group at a wide-angle end.

Thereby, the negative refractive power of the fifth lens group raises heights of off-axis rays transmitted through the fifth lens group up to the high image height. Further, when Conditional Expression (3) is satisfied, an angle of incidence of exit light of the optical system incident onto an image plane decreases.

There is provided another imaging apparatus including: a zoom lens; and an imaging device that converts an optical image, which is formed by the zoom lens, into an electric signal. The zoom lens includes, in order from an object side, a first lens group that has a positive refractive power, a second lens group that has a negative refractive power, a third lens group that has a positive refractive power, a fourth lens group that has a negative refractive power, and a fifth lens group that has a negative refractive power. During zooming from a wide-angle end state in which a focal length is shortest to a telephoto end state in which a focal length is longest, the lens groups are moved in an optical axis direction such that air spacing between the first lens group and the second lens group increases, air spacing between the second lens group and the third lens group decreases, and spacing between the third lens group and the fourth lens group changes. The zoom lens satisfies the following Conditional Expression (3).

$$1.018 < \beta 5w \leq 4.0, \tag{3}$$

where $\beta 5w$ is a lateral magnification of the fifth lens group at a wide-angle end.

Thereby, in the zoom lens, the negative refractive power of the fifth lens group raises heights of off-axis rays transmitted through the fifth lens group up to the high image height. Further, when Conditional Expression (3) is satisfied, an angle of incidence of exit light of the optical system incident onto an image plane decreases.

According to the present technology, the zoom lens is compatible with a large-size imaging device while having a small size, and performs focusing at a high speed appropriate for capturing a moving image while achieving high imaging performance.

BRIEF DESCRIPTION OF THE DRAWINGS

FIG. 19 is a block diagram illustrating an example of an imaging apparatus.

DETAILED DESCRIPTION OF EMBODIMENTS

Figure 1:
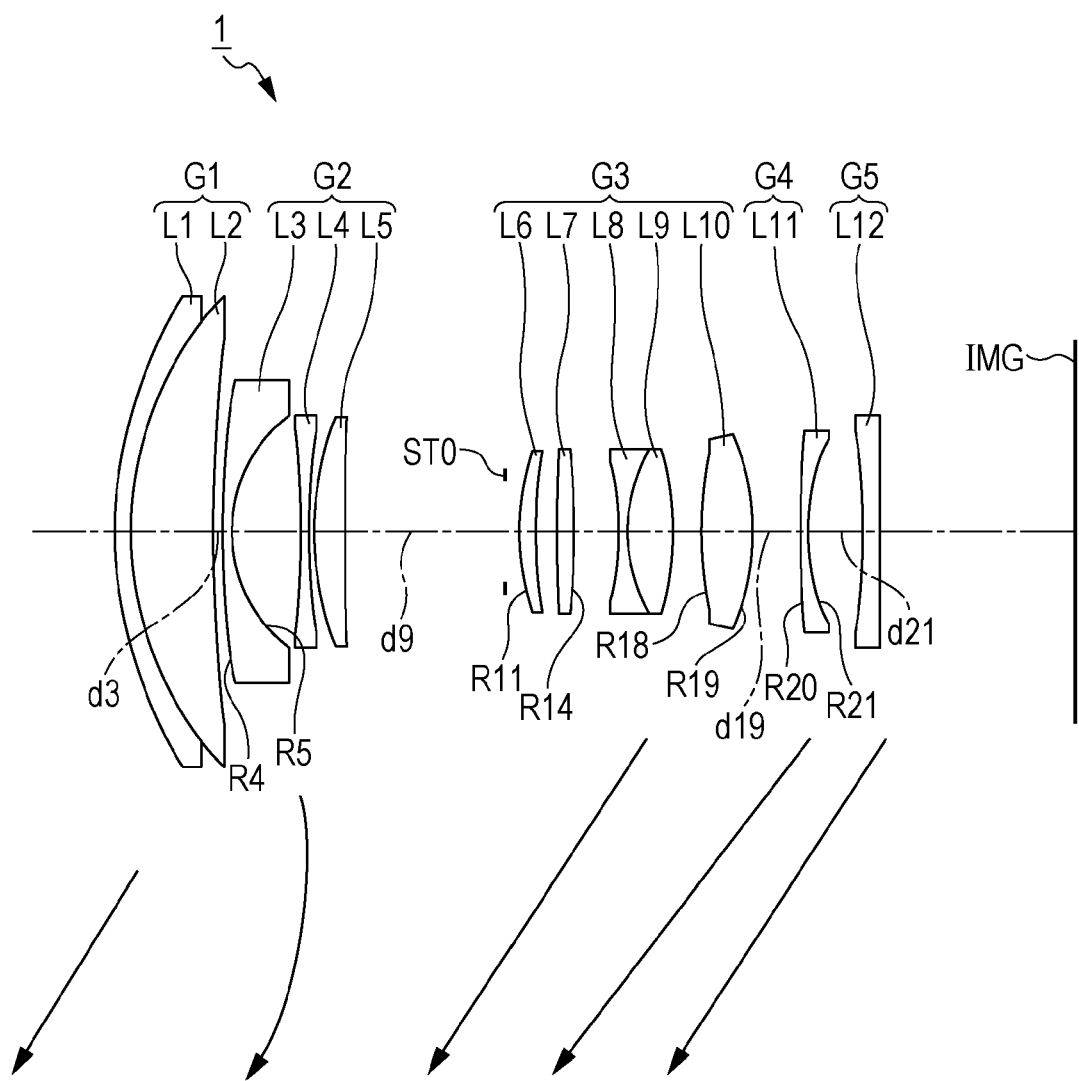
FIG. 1 is a diagram illustrating a lens configuration of a zoom lens according to a first embodiment included in embodiments of the zoom lenses and the imaging apparatuses according to the present technology shown in FIGS. 2 to 19.

Hereinafter, embodiments for embodying a zoom lens and an imaging apparatus according to the present technology will be described.

Configuration of Zoom Lens

The zoom lens according to the present technology includes, in order from an object side to an image side: a first lens group that has a positive refractive power; a second lens group that has a negative refractive power; a third lens group that has a positive refractive power; a fourth lens group that has a negative refractive power; and a fifth lens group that has a negative refractive power.

As described above, the zoom lens according to the present technology is configured such that the fifth lens group has a negative refractive power. Hence, the negative refractive power of the fifth lens group raises heights of off-axis rays transmitted through the fifth lens group up to a high image height. As a result, by minimizing the diameter of the entire optical system including the fifth lens group, the zoom lens is compatible with a large-size imaging device while having a small size.

Since the diameter of the entire optical system is minimized, the size of the focus lens group can also be reduced, and the height of rays passing through the focus lens group decreases. Hence, occurrence of aberrations is suppressed, and the focus lens group can be formed of a smaller number of lenses. Accordingly, it is possible to perform focusing at a high speed appropriate for capturing a moving image.

In the zoom lens according to the present technology, during zooming from a wide-angle end state in which a focal length is shortest to a telephoto end state in which a focal length is longest, air spacing between the first and second lens groups increases, air spacing between the second and third lens groups decreases, spacing between the third and fourth lens groups changes, and spacing between the fourth and fifth lens groups changes. Thus, all the lens groups are moved in an optical axis direction.

The zoom lens according to the present technology satisfies the following Conditional Expression (1).

$$1.0 < \beta 5w \leq 4.0, \quad (1)$$

where β5w is a lateral magnification of the fifth lens group at a wide-angle end.

Conditional Expression (1) defines an appropriate range of the magnification of the fifth lens group at the wide-angle end.

When the result of Conditional Expression (1) is greater than the upper limit thereof, it is difficult to correct aberrations occurring in the fifth lens group or satisfy restriction in the back focal length of the interchangeable lens. Further, the angle of incidence of the exit light of the optical system incident onto the image plane increases, and is thus inappropriate for the directivity of the light receiving portion of the imaging device.

In contrast, when the result of Conditional Expression (1) is less than the lower limit thereof, the lateral magnification is less than 1. Thus, the effect of raising the heights of the off-axis rays is lost.

Accordingly, by making the zoom lens satisfy Conditional Expression (1), it is possible to correct aberrations occurring in the fifth lens group or satisfy the restriction in the back focal length of the interchangeable lens. Further, the angle of incidence of the exit light of the optical system incident onto the image plane decreases. Thus, it is possible to secure favorable compatibility with the directivity of the light receiving portion of the imaging device, and it is also possible to secure high imaging performance.

In order to obtain better optical performance, it is preferable that the zoom lens satisfy the following Conditional Expression (1)'.

$$1.0 < \beta 5w \leq 3.0 \quad (1)'$$

By making the zoom lens satisfy Conditional Expression (1)', it is possible to correct aberrations occurring in the fifth lens group or sufficiently satisfy the restriction in the back focal length of the interchangeable lens. Further, the angle of incidence of the exit light of the optical system incident onto the image plane decreases. Thus, it is possible to secure better compatibility with the directivity of the light receiving portion of the imaging device.

Further, in order to obtain still better optical performance, it is preferable that the zoom lens satisfy the following Conditional Expression (1)".

$$1.0 < \beta 5w \leq 2.0 \quad (1)''$$

By making the zoom lens satisfy Conditional Expression (1)", it is possible to correct aberrations occurring in the fifth lens group or more sufficiently satisfy the restriction in the back focal length of the interchangeable lens. Further, the angle of incidence of the exit light of the optical system incident onto the image plane decreases. Thus, it is possible to secure still better compatibility with the directivity of the light receiving portion of the imaging device.

In order to obtain still better optical performance, it is preferable that the zoom lens satisfy the following Conditional Expression (1)'''.

$$1.018 < \beta 5w \leq 1.5 \quad (1)'''$$

By making the zoom lens satisfy Conditional Expression (1)''', it is possible to correct aberrations occurring in the fifth lens group or further more sufficiently satisfy the restriction in the back focal length of the interchangeable lens. Further, the angle of incidence of the exit light of the optical system incident onto the image plane decreases. Thus, it is possible to secure the best compatibility with the directivity of the light receiving portion of the imaging device.

In the zoom lens according to an embodiment of the present technology, it is preferable that the fourth lens group satisfy the following Conditional Expression (2).

$$0.7 < (R4f + R4r)/(R4f - R4r) \leq 3.0, \quad (2)$$

where

R4f is a radius of curvature of a surface of the fourth lens group closest to the object side, and R4r is a radius of curvature of a surface of the fourth lens group closest to the image side.

Conditional Expression (2) defines a shape factor of the fourth lens group.

When the result of Conditional Expression (2) is less than the lower limit thereof, the surface of the fourth lens group closest to the object side is formed as a concave surface of which the curvature is large, and the angle of incidence of on-axis marginal rays passing through the corresponding surface becomes large. Hence, it is difficult to suppress spherical aberration.

In contrast, when the result of Conditional Expression (2) is greater than the upper limit thereof, the surface closest to the image side in the fourth lens group is formed as a concave surface of which the curvature is large, and the angle of incidence of off-axis marginal rays passing through the corresponding surface becomes large. Hence, it is difficult to suppress comatic aberration.

Accordingly, by making the zoom lens satisfy Conditional Expression (2), the surface closest to the object side and the surface closest to the image side in the fourth lens group are not formed as concave surfaces of which the curvature is excessively large. Hence, an angle of incidence of off-axis marginal rays passing through the surfaces does not increase, and it is possible to favorably suppress spherical aberration and comatic aberration.

In order to obtain better optical performance, it is preferable that the zoom lens satisfy the following Conditional Expression (2)'.

$$1.0 < (R4f + R4r)/(R4f - R4r) \leq 2.5 \quad (2)'$$

By making the zoom lens satisfy Conditional Expression (2)', it is possible to further favorably suppress spherical aberration and comatic aberration.

In the zoom lens according to an embodiment of the present technology, it is preferable that the fourth lens group be moved in the optical axis direction so as to correct a change in an image formation position caused by a change in an object distance.

By moving the fourth lens group in the optical axis direction so as to correct a change in an image formation position caused by a change in an object distance, the fourth lens group functions as a focus lens group. By making the fourth lens group, of which the diameter of rays is small and which is not exposed to the outside, a focus lens group, it is possible to secure a lightweight focus lens group quite appropriate for capturing a moving image.

In the zoom lens according to an embodiment of the present technology, it is preferable that the fourth lens group be formed of one negative lens or one cemented lens.

Since the fourth lens group is formed of one negative lens or one cemented lens, it is possible to achieve reduction in the weight.

In the zoom lens according to an embodiment of the present technology, it is preferable that the third lens group and the fifth lens group be integrally moved in the optical axis direction during zooming.

Since the third lens group and the fifth lens group are integrally moved in the optical axis direction during zooming, it is possible to simplify the structure thereof.

With such a configuration, for example, it is possible to make a structure in which the third, fourth, and fifth lens groups are formed integrally with a cam cylinder for moving the lens groups in the optical axis direction and the fourth lens group as a focus lens group moves in the cam cylinder. Thereby, it is possible to achieve reduction in the size and low costs. Further, it is possible to assemble, with high accuracy in the relative position, such lens groups as have a tendency for relative sensitivities in eccentricities between the lens groups to increase.

In the zoom lens according to an embodiment of the present technology, it is preferable that the fourth lens group have at least one aspheric surface.

Since the fourth lens group has at least one aspheric surface, using a small number of the lenses, aberration variation caused by focusing is suppressed. Thus, it is possible to secure a lightweight focus lens group quite appropriate for capturing a moving image, and it is possible to suppress change in aberrations caused by focusing, and it is possible to secure high optical performance.

In the zoom lens according to an embodiment of the present technology, it is preferable that the third lens group be formed of a plurality of lenses and some lenses of the third lens group be moved in a direction perpendicular to the optical axis direction so as to correct image blur.

Since some lenses of the third lens group are moved in a direction perpendicular to the optical axis direction so as to correct image blur, the diameter and the weight of the group for blur correction are reduced. Thus, it is possible to reduce the size of a blur correction unit including an actuator that drives the group for blur correction, and it is possible to achieve reduction in the size of the entire zoom lens.

In the zoom lens according to an embodiment of the present technology, it is preferable that some lenses of the third lens group, which are moved in the direction perpendicular to the optical axis direction, have at least one aspheric surface.

Since some lenses of the third lens group, which are moved in the direction perpendicular to the optical axis direction, have at least one aspheric surface, when the corresponding lenses are moved in the direction perpendicular to the optical axis direction at the time of blur correction, the surfaces of the lenses can be made to have such shapes as compensate changes in angles of incidence onto the surfaces in the group for blur correction. Hence, it is possible to improve optical performance at the time of blur correction.

The above description deals with the example in which some lenses of the third lens group are set as a group for blur correction. However, all or some lenses of the fourth lens group or the fifth lens group may be set as a group for blur correction, and image blur may be corrected.

However, in the third lens group, the largest diameter of rays becomes small. Hence, by setting the third lens group as a group for blur correction, the weight of the group for blur correction is reduced. As a result, it is possible to improve image quality through an increase in the speed of the processing of blur correction. In contrast, by setting the fourth lens group or the fifth lens group as a group for blur correction, the change in aberrations becomes small. Hence, it is possible to improve performance at the time of blur correction.

In the zoom lens according to the present technology, it is preferable that the lens of the third lens group closest to the object side be formed as a positive lens and the surface closest to the object side be formed as an aspheric surface of which a negative component is larger at a position closer to the outer periphery thereof.

By forming the lens of the third lens group closest to the object side as a positive lens and forming the surface closest to the object side as an aspheric surface of which a negative component is larger at a position closer to the outer periphery thereof, it is possible to suppress spherical aberration occurring in the third lens group, and it is possible to increase a refractive power of the third lens group. Hence, it is possible to reduce the total length of the zoom lens.

As the refractive power of the third lens group increases, the ray height of rays passing through the fourth lens group decreases. Hence, by setting the fourth lens group or the fifth lens group as a focus lens group, it is possible to reduce the weight of the focus lens group, and it is possible to perform focusing at a high speed. Further, with such a configuration, it is possible to reduce the size of a driving mechanism including an actuator that drives lens groups, and it is possible to further reduce the size of the imaging apparatus.

It should be noted that, in the zoom lens according to the present technology, an optical member such as a cover glass or an optical filter may be disposed between the fifth lens group and the image plane.

Configuration of Different Zoom Lens

A different zoom lens according to the present technology includes, in order from an object side to an image side: a first lens group that has a positive refractive power; a second lens group that has a negative refractive power; a third lens group that has a positive refractive power; a fourth lens group that has a negative refractive power; and a fifth lens group that has a negative refractive power.

As described above, the different zoom lens according to the present technology is configured such that the fifth lens group has a negative refractive power. Hence, the negative refractive power of the fifth lens group raises heights of off-axis rays transmitted through the fifth lens group up to the high image height. As a result, by minimizing the diameter of the entire optical system including the fifth lens group, the zoom lens is compatible with a large-size imaging device while having a small size.

Since the diameter of the entire optical system is minimized, the size of the focus lens group can also be reduced, and the height of rays passing through the focus lens group decreases. Hence, occurrence of aberrations is suppressed, and the focus lens group can be formed of a smaller number of lenses. Accordingly, it is possible to perform focusing at a high speed appropriate for capturing a moving image.

In the different zoom lens according to the present technology, during zooming from a wide-angle end state in which a focal length is shortest to a telephoto end state in which a focal length is longest, air spacing between the first and second lens groups increases, air spacing between the second and third lens groups decreases, and spacing between the third and fourth lens groups changes. Thus, all the lens groups are moved in an optical axis direction.

The different zoom lens according to the present technology satisfies the following Conditional Expression (3).

$$1.018 < \beta 5w \leq 4.0, \tag{3}$$

where $\beta 5w$ is a lateral magnification of the fifth lens group at a wide-angle end.

Conditional Expression (3) defines an appropriate range of the magnification of the fifth lens group at the wide-angle end.

When the result of Conditional Expression (3) is greater than the upper limit thereof, it is difficult to correct aberrations occurring in the fifth lens group or satisfy restriction in the back focal length of the interchangeable lens. Further, the angle of incidence of the exit light of the optical system incident onto the image plane increases, and is thus inappropriate for the directivity of the light receiving portion of the imaging device.

In contrast, when the result of Conditional Expression (3) is less than the lower limit thereof, the lateral magnification is less than 1.018. Thus, the effect of raising the heights of the off-axis rays is insufficient or is lost.

Accordingly, by making the zoom lens satisfy Conditional Expression (3), it is possible to correct aberrations occurring in the fifth lens group or satisfy the restriction in the back focal length of the interchangeable lens. Further, the angle of incidence of the exit light of the optical system incident onto the image plane decreases. Thus, it is possible to secure favorable compatibility with the directivity of the light receiving portion of the imaging device, and it is also possible to secure high imaging performance.

In order to obtain better optical performance, it is preferable that the zoom lens satisfy the following Conditional Expression (3)'.

$$1.018 < \beta 5w \leq 3.0 \qquad (3)'$$

By making the zoom lens satisfy Conditional Expression (3)', it is possible to correct aberrations occurring in the fifth lens group or sufficiently satisfy the restriction in the back focal length of the interchangeable lens. Further, the angle of incidence of the exit light of the optical system incident onto the image plane decreases. Thus, it is possible to secure better compatibility with the directivity of the light receiving portion of the imaging device.

Further, in order to obtain still better optical performance, it is preferable that the zoom lens satisfy the following Conditional Expression (3)".

$$1.018 < \beta 5w \leq 2.0 \qquad (3)''$$

By making the zoom lens satisfy Conditional Expression (3)", it is possible to correct aberrations occurring in the fifth lens group or more sufficiently satisfy the restriction in the back focal length of the interchangeable lens. Further, the angle of incidence of the exit light of the optical system incident onto the image plane decreases. Thus, it is possible to secure still better compatibility with the directivity of the light receiving portion of the imaging device.

In order to obtain still better optical performance, it is preferable that the zoom lens satisfy the following Conditional Expression (3)'''.

$$1.018 < \beta 5w \leq 1.5 \qquad (3)'''$$

By making the zoom lens satisfy Conditional Expression (3)''', it is possible to correct aberrations occurring in the fifth lens group or further more sufficiently satisfy the restriction in the back focal length of the interchangeable lens. Further, the angle of incidence of the exit light of the optical system incident onto the image plane decreases. Thus, it is possible to secure the best compatibility with the directivity of the light receiving portion of the imaging device.

Numerical Examples of Zoom Lens

Hereinafter, numerical examples will be described with reference to the accompanying drawings and tables, in which specific numerical values are applied to the zoom lens according to the embodiment of the technology.

It should be noted that, in the accompanying drawings and tables, the reference signs and the like are defined as follows.

The "surface number" indicates an i-th surface counted from the object side to the image side, "Ri" indicates a paraxial radius of curvature of the i-th surface, "di" indicates an on-axis surface space between the i-th surface and an (i+1)th surface (the thickness or the air gap at the center of the lens), "ni" indicates a refractive index of a lens or the like including the i-th surface at the d-line ($\lambda$=587.6 nm), and "vi" indicates an Abbe number of the lens or the like including the i-th surface at the d-line.

Regarding the "surface number", "*" indicates that the corresponding surface is aspheric, and "STO" indicates that the corresponding surface is an aperture stop. In addition, regarding "Ri", "∞" indicates that the corresponding surface is planar.

Regarding "di", "dn (n is a number)" indicates variable spacing, and "Bf" indicates a back focal length.

"$\kappa$" indicates a conic constant, and "C4", "C6", "C8", and "C10" respectively indicate 4th-order, 6th-order, 8th-order, and 10th-order aspheric surface coefficients.

"f" indicates a focal length of the whole lens system, "Fno" indicates an open f number, and "$\omega$" indicates a half angle of view.

In addition, in the respective tables showing the aspheric surface coefficients to be described below, the reference sign "E-n" indicates an exponential expression having a base of 10, that is, "$10^{-n}$". For example, "0.12345E-05" indicates "$0.12345 \times 10^{-5}$".

Some zoom lenses used in the embodiments are configured so that the lens surface is formed to be aspheric. Here, it is assumed that "x" is the distance (the sag amount) from the vertex of the lens surface in the direction of the optical axis, "y" is the height (the image height) in the direction perpendicular to the direction of the optical axis, "c" is the paraxial radius of curvature (the inverse of the radius of curvature) at the vertex of the lens, "K" is the conic constant, and "C4", "C6", "C8", and "C10" are respectively the 4th-order, 6th-order, 8th-order, and 10th-order aspheric surface coefficients, and the aspheric surface shape is defined as the following Numerical Expression 1.

$$x = \frac{cy^2}{1 + \{1 - (1+\kappa)c^2 y^2\}^{1/2}} + C4 \cdot y^4 + C6 \cdot y^6 + C8 \cdot y^8 + C10 \cdot y^{10} \qquad \text{Numerical Expression 1}$$

First Embodiment

FIG. 1 shows a lens configuration of a zoom lens 1 according to a first embodiment of the present technology.

The zoom lens 1 has a zoom ratio of 2.4 times. The zoom lens 1 has twelve lenses, and includes, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a negative refractive power.

In the zoom lens 1, during zooming from a wide-angle end state in which a focal length is shortest to a telephoto end state in which a focal length is longest, air spacing between the first and second lens groups G1 and G2 increases, air spacing between the second and third lens groups G2 and G3 decreases, spacing between the third and fourth lens groups G3 and G4 changes, and spacing between the fourth and fifth lens groups G4 and G5 changes. Thus, all the lens groups are moved in an optical axis direction.

During zooming, the third lens group G3 and the fifth lens group G5 are integrally moved in the optical axis direction.

In the zoom lens 1, the fourth lens group G4 is set as a focus lens group that adjusts a focal point from an infinite distance to a close distance by moving in the optical axis direction during focusing.

The first lens group G1 is formed of a cemented lens. The cemented lens is formed by cementing a first lens L1 and a second lens L2. The first lens L1 has a meniscus shape convex toward the object side, and has a negative refractive power. The second lens L2 is positioned to be close to the image side of the first lens L1, has a meniscus shape convex toward the object side, and has a positive refractive power.

The second lens group G2 includes, in order from the object side to the image side: a third lens L3 that has a meniscus shape convex toward the object side and has a negative refractive power; a fourth lens L4 that has a biconcave shape and has a negative refractive power; and a fifth lens L5 that has a meniscus shape convex toward the object side and a positive refractive power.

The third lens group G3 includes, in order from the object side to the image side: a sixth lens L6 that has a meniscus shape convex toward the object side and has a positive refractive power; a seventh lens L7 that has a biconvex shape and has a positive refractive power; a cemented lens that is formed by cementing an eighth lens L8 having a biconcave shape and having a negative refractive power and a ninth lens L9 having a biconvex shape and a positive refractive power; and a tenth lens L10 that has a biconvex shape and a positive refractive power.

The fourth lens group G4 is formed of an eleventh lens L11 that has a meniscus shape convex toward the object side and a negative refractive power.

The fifth lens group G5 is formed of a twelfth lens L12 that has a meniscus shape concave toward the object side and has a negative refractive power.

An image plane IMG is disposed to be close to the image side of the fifth lens group G5.

An aperture stop STO is disposed between the second lens group G2 and the third lens group G3. The aperture stop STO is moved integrally with the third lens group G3 in the optical axis direction during zooming.

The seventh lens L7 of the third lens group G3 is set as a group for blur correction (blur correction lens), and is moved in the direction perpendicular to the optical axis direction at the time of blur correction.

Table 1 shows the lens data of Numerical Example 1 of the zoom lens 1, to which specific numerical values are applied, according to the first embodiment.

TABLE 1

| SURFACE NUMBER | Ri | di | ni | νi |
|---|---|---|---|---|
| 1 | 49.81 | 1.90 | 1.8467 | 23.7800 |
| 2 | 39.45 | 9.57 | 1.6180 | 63.3900 |
| 3 | 249.93 | d3 | | |
| *4 | 83.65 | 1.20 | 1.8820 | 37.2200 |
| 5 | 15.43 | 8.07 | | |
| 6 | −96.09 | 0.80 | 1.8042 | 46.5000 |
| 7 | 81.38 | 0.50 | | |
| 8 | 34.38 | 3.80 | 1.9229 | 20.8800 |
| 9 | 2001.28 | d9 | | |
| 10(STO) | ∞ | 1.50 | | |
| *11 | 22.44 | 1.93 | 1.8820 | 37.2200 |
| 12 | 39.42 | 2.54 | | |
| 13 | 112.89 | 1.85 | 1.6188 | 63.8500 |
| *14 | −84.01 | 5.27 | | |
| 15 | −34.03 | 0.90 | 1.7552 | 27.5300 |
| 16 | 16.80 | 5.29 | 1.4970 | 81.6100 |
| 17 | −34.01 | 3.34 | | |
| *18 | 38.67 | 6.00 | 1.7308 | 40.5000 |
| *19 | −28.50 | d19 | | |
| *20 | 86.47 | 0.80 | 1.6935 | 53.2000 |
| *21 | 23.23 | d21 | | |
| 22 | −75.65 | 2.00 | 1.5168 | 64.2000 |
| 23 | −1017.71 | Bf | | |

(*: ASPHERIC SURFACE)

In the zoom lens 1, both surfaces (fourth and fifth surfaces) of the third lens L3 of the second lens group G2, an object side surface (eleventh surface) of the sixth lens L6 of the third lens group G3, an image side surface (fourteenth surface) of the seventh lens L7 of the third lens group G3, both surfaces (eighteenth and nineteenth surfaces) of the tenth lens L10 of the third lens group G3, and both surfaces (twentieth and twenty-first surfaces) of the eleventh lens L11 of the fourth lens group G4 are formed as aspheric surfaces. Table 2 shows the 4th-order, 6th-order, 8th-order, and 10th-order aspheric surface coefficients C4, C6, C8, and C10 of the aspheric surfaces, together with the conic constant κ, in Numerical Example 1.

TABLE 2

| SURFACE NUMBER | κ | C4 | C6 | C8 | C10 |
|---|---|---|---|---|---|
| 4 | −10.000 | −7.87474E−07 | −1.64263E−09 | −1.54101E−11 | 5.95661E−14 |
| 5 | 0.000 | −9.12898E−06 | −3.02098E−08 | −1.06600E−10 | −1.22398E−12 |
| 11 | 0.000 | −3.59523E−06 | −2.02675E−08 | 3.33129E−10 | −1.32050E−12 |
| 14 | 0.000 | 4.19351E−06 | −4.65184E−08 | 9.81220E−10 | −4.61583E−12 |
| 18 | 0.000 | −1.61327E−05 | 2.98297E−08 | −4.27852E−10 | −2.47093E−13 |
| 19 | 0.000 | 2.40463E−06 | 5.51724E−08 | −9.98563E−10 | 1.93810E−12 |
| 20 | 0.000 | −6.22100E−06 | 1.80231E−07 | −3.82331E−09 | 1.80306E−11 |
| 21 | 0.000 | −4.39363E−06 | 9.30265E−08 | −2.99061E−09 | 1.49891E−11 |

Table 3 shows, together with the variable spacing, the focal length f of the whole lens system, the open f number Fno, and the half angle of view ω, in Numerical Example 1.

TABLE 3

|  | WIDE-ANGLE END | MIDDLE | TELEPHOTO END |
|---|---|---|---|
| f | 28.84 | 47.06 | 67.90 |
| Fno | 4.12 | 4.11 | 4.12 |
| ω | 37.05 | 23.46 | 16.72 |
| d3 | 0.80 | 17.06 | 26.56 |
| d9 | 18.40 | 7.98 | 2.02 |
| d19 | 5.49 | 3.87 | 2.00 |
| d21 | 6.45 | 8.07 | 9.94 |
| Bf | 22.78 | 30.43 | 39.35 |

Figure 2:
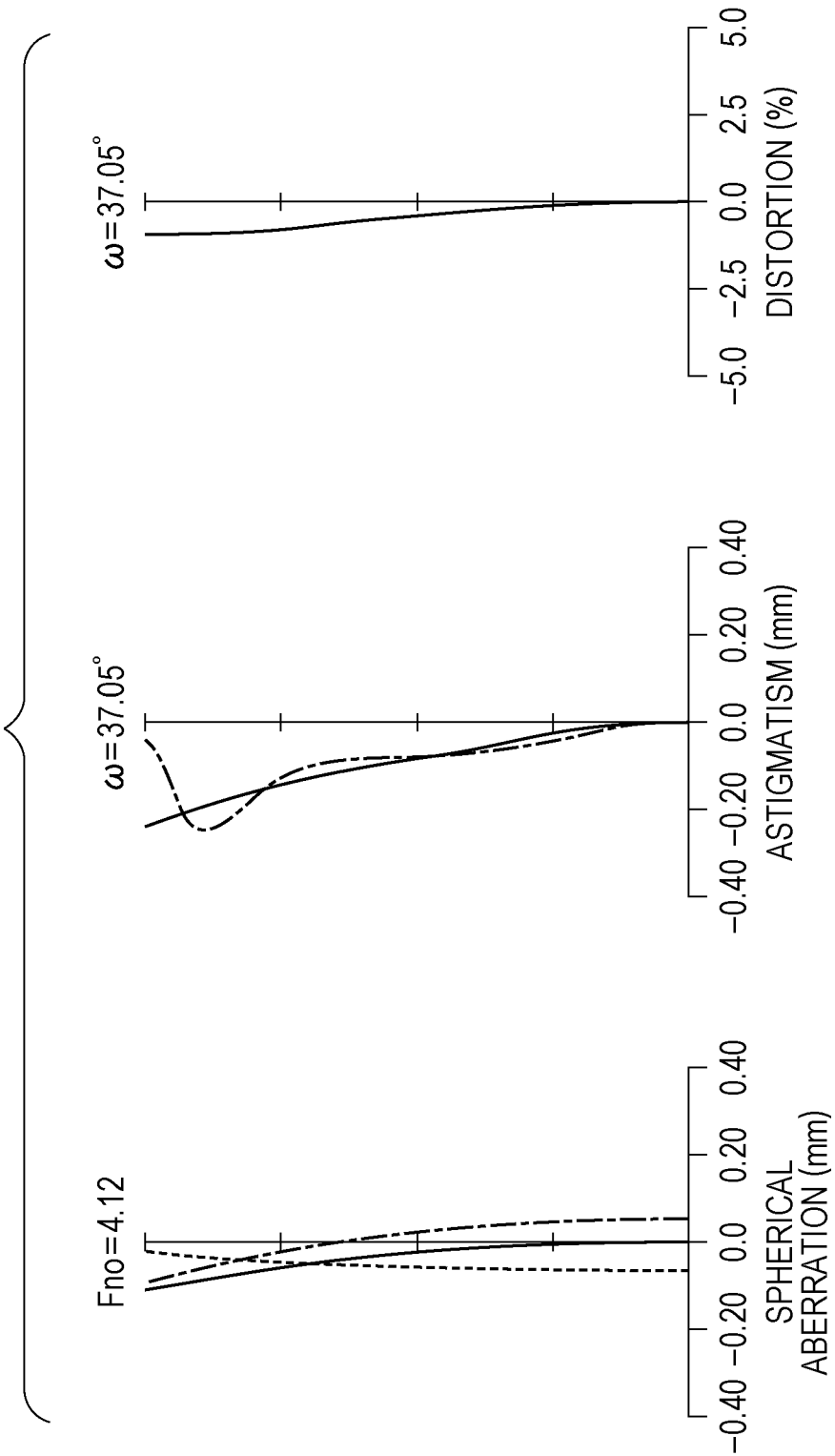
FIG. 2 is a diagram illustrating spherical aberration, astigmatism, and distortion at the wide-angle end in a numerical example in which specific numerical values are applied to the first embodiment.
Figure 3:
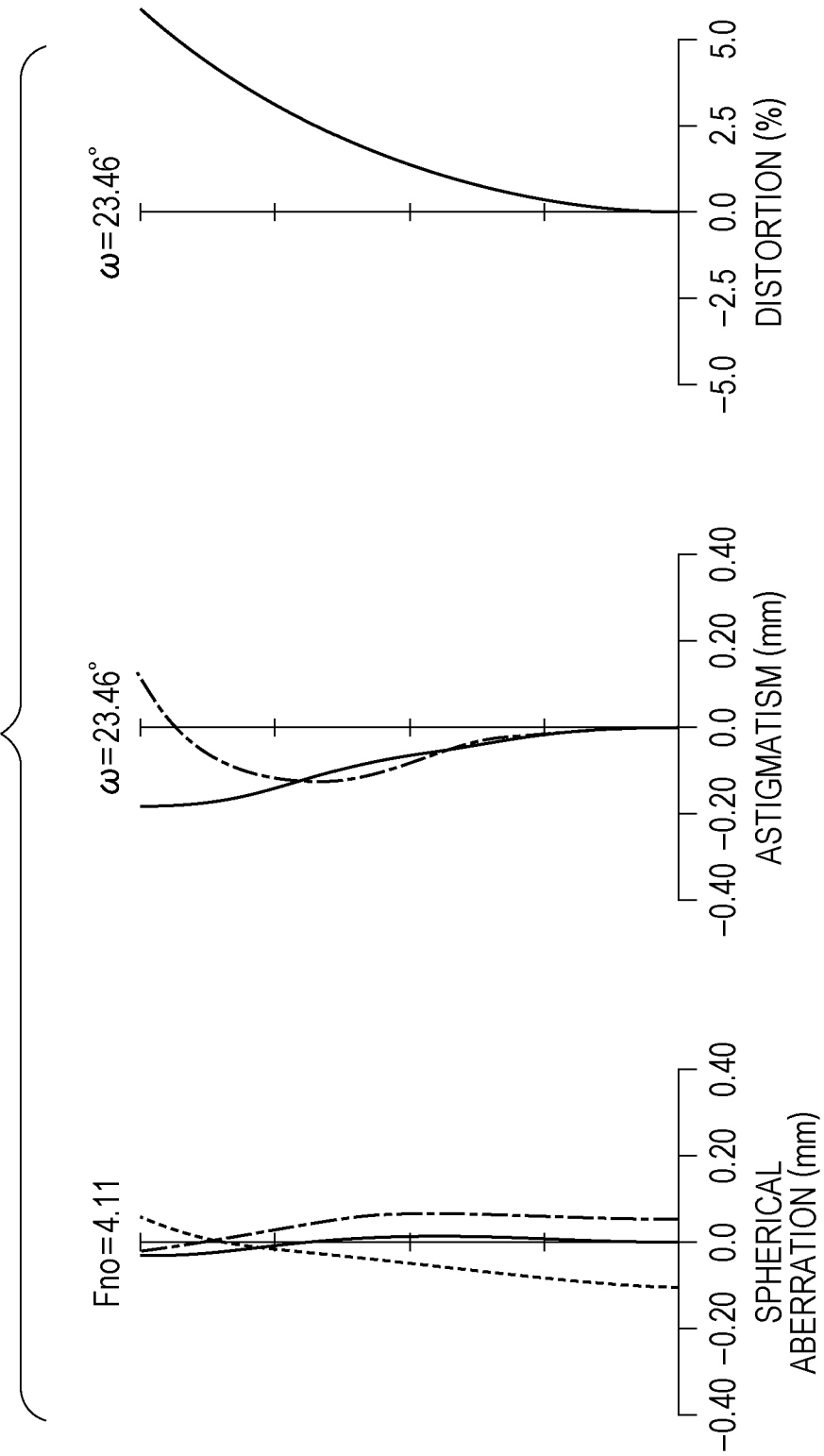
FIG. 3 is a diagram illustrating spherical aberration, astigmatism, and distortion at the middle focal length in the numerical example in which specific numerical values are applied to the first embodiment.
Figure 4:
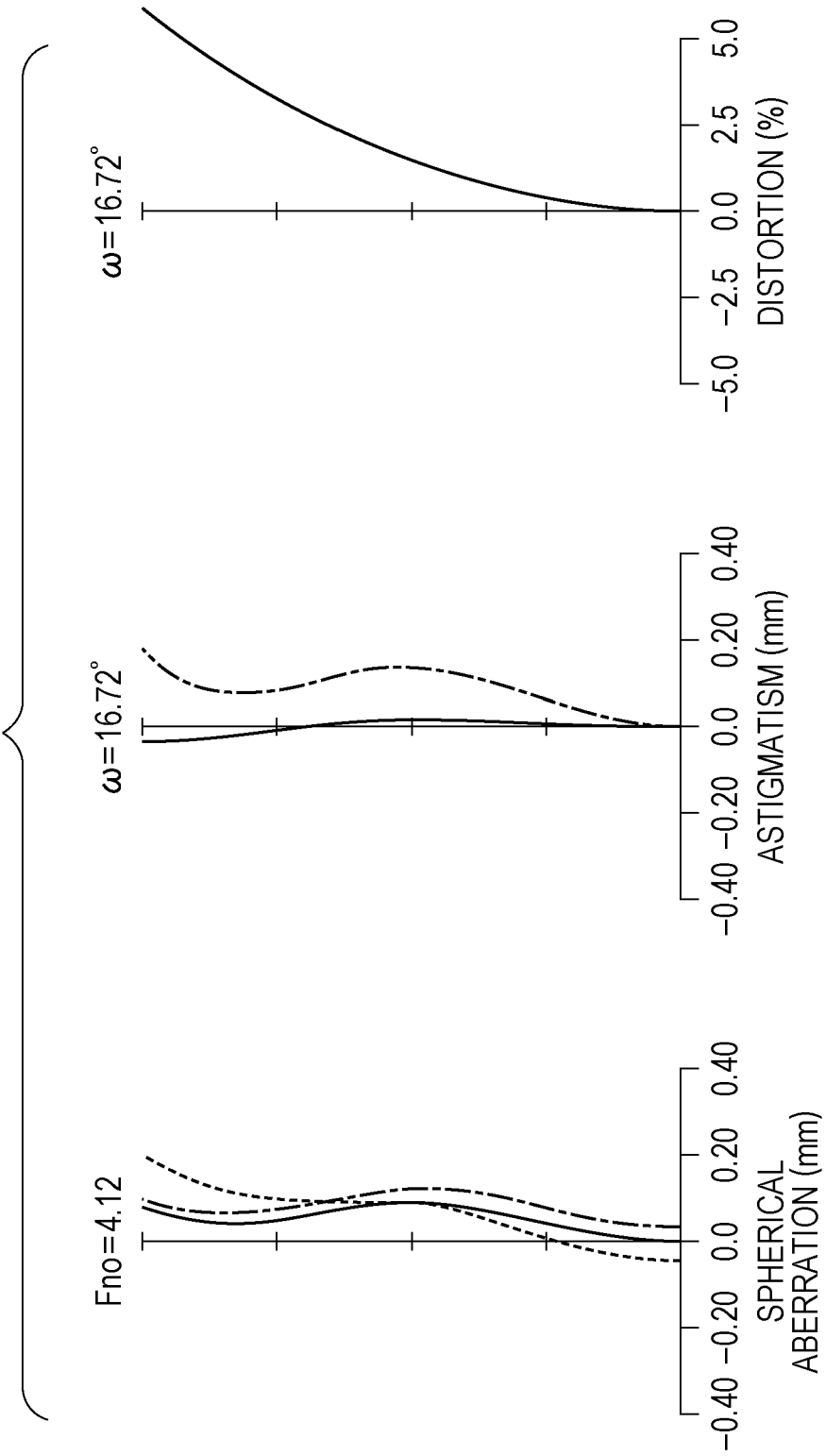
FIG. 4 is a diagram illustrating spherical aberration, astigmatism, and distortion at the telephoto end in the numerical example in which specific numerical values are applied to the first embodiment.

FIG. 2 shows spherical aberration, astigmatism, and distortion at the wide-angle end in Numerical Example 1. FIG. 3 shows spherical aberration, astigmatism, and distortion at the middle focal length in Numerical Example 1. FIG. 4 shows spherical aberration, astigmatism, and distortion at the telephoto end in Numerical Example 1.

In each spherical aberration diagram of FIGS. 2 to 4, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

Figure 5:
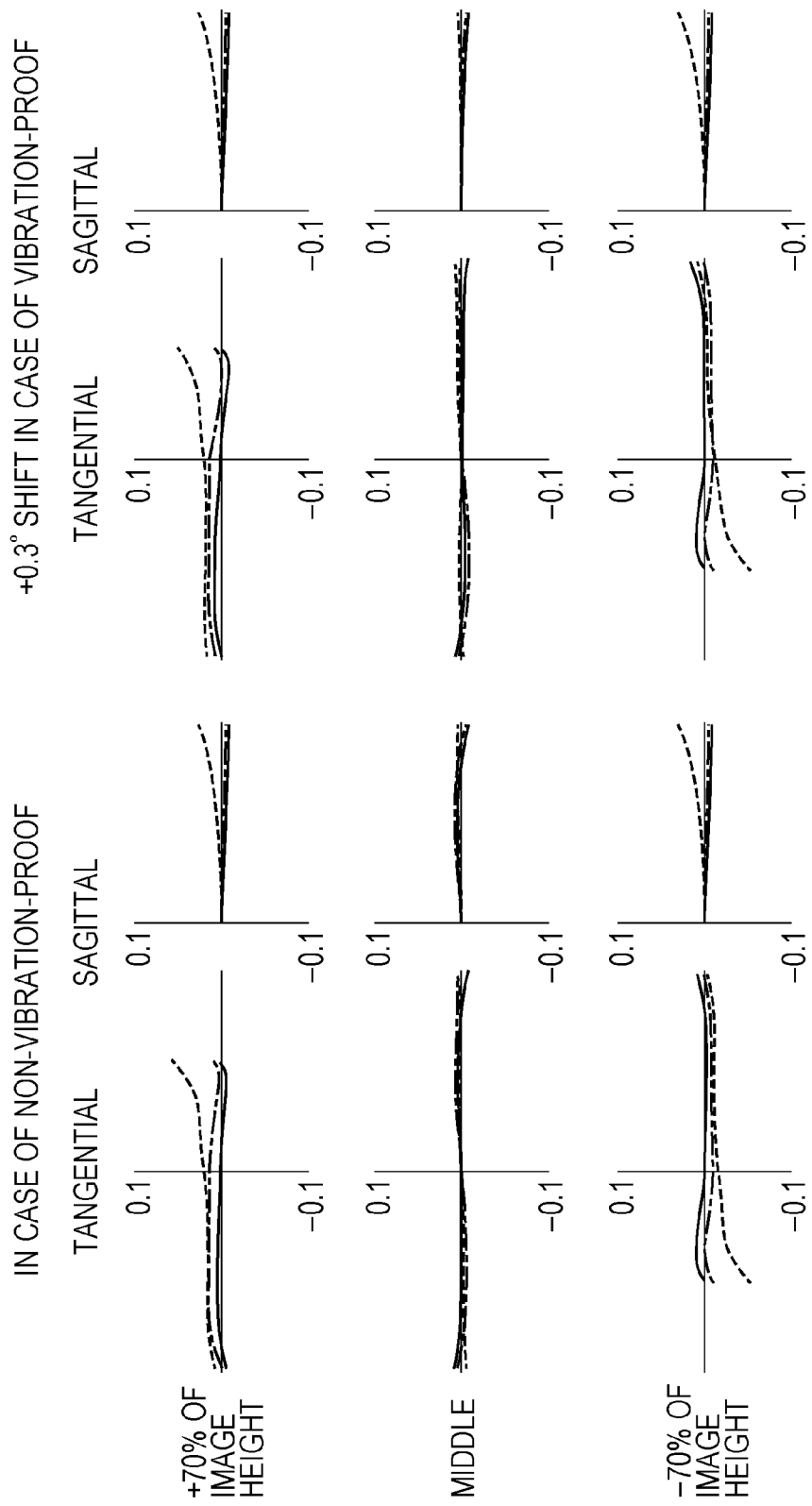
FIG. 5 is a diagram of lateral aberrations at the wide-angle end in the numerical example in which specific numerical values are applied to the first embodiment.
Figure 6:
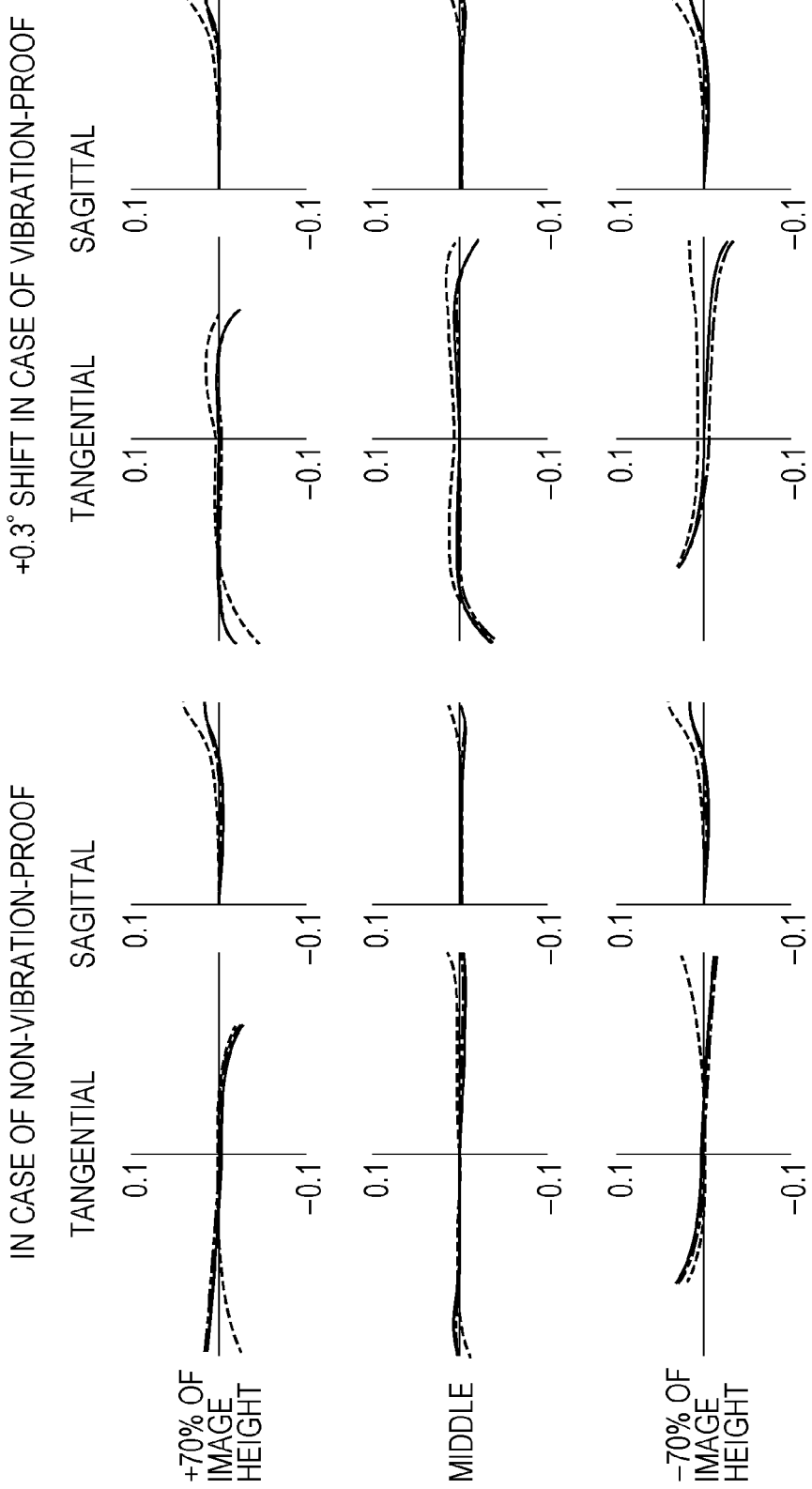
FIG. 6 is a diagram of lateral aberrations at the telephoto end in the numerical example in which specific numerical values are applied to the first embodiment.

FIG. 5 shows lateral aberrations in a case of non-vibration-proof (non-blur correction) and lateral aberrations in a case of shift of 0.3° and vibration-proof (blur correction) at the wide-angle end in Numerical Example 1. FIG. 6 shows lateral aberrations in a case of non-vibration-proof (non-blur correction) and lateral aberrations in a case of shift of 0.3° and vibration-proof (blur correction) at the telephoto end in Numerical Example 1.

In each of FIGS. 5 and 6, the left side indicates the meridional (tangential) image plane, the right side indicates the value of the sagittal image plane, the chain line indicates the value of the C-line, the solid line indicates the value of the d-line, and the dotted line indicates the value of the g-line.

As can be clearly seen from the aberration diagrams, in Numerical Example 1, it is possible to obtain excellent imaging performance by satisfactorily correcting various aberrations.

Second Embodiment

Figure 7:
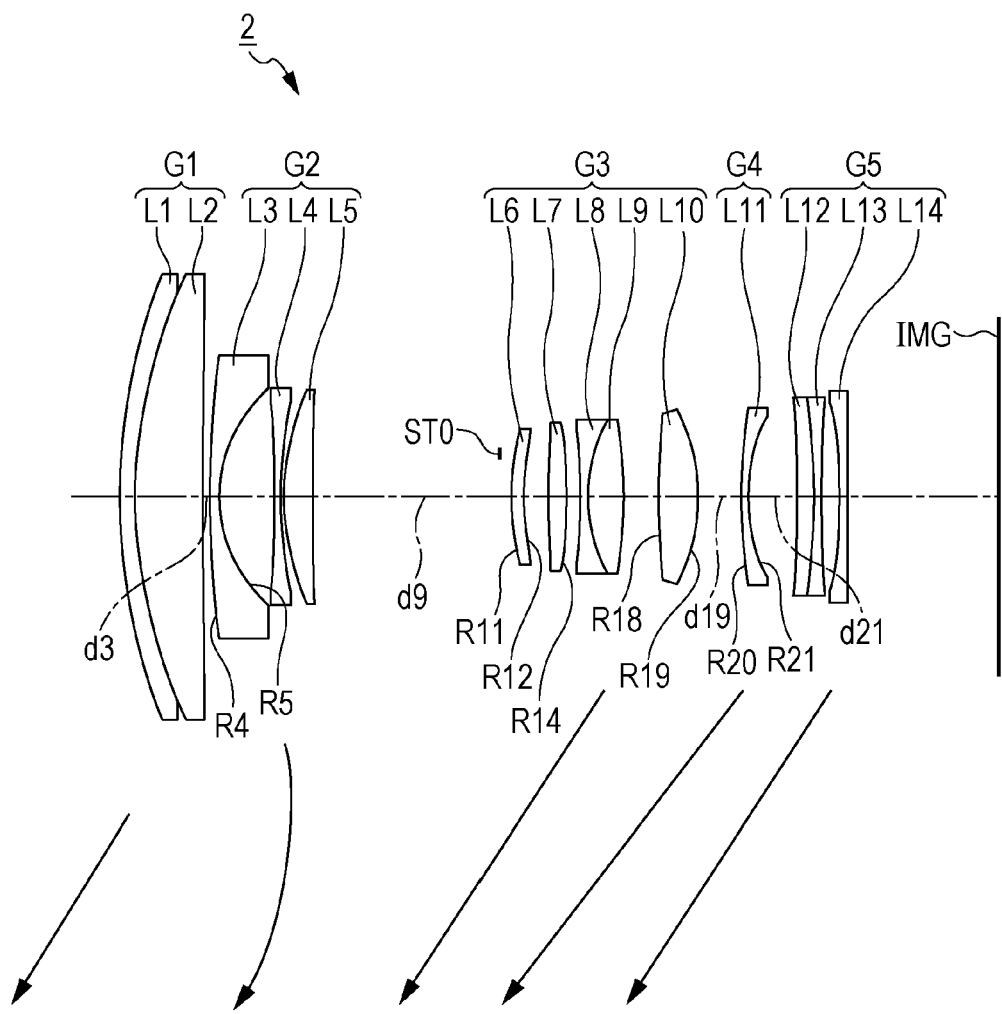
FIG. 7 is a diagram illustrating a lens configuration of a zoom lens according to a second embodiment.

FIG. 7 shows a lens configuration of a zoom lens 2 according to a second embodiment of the present technology.

The zoom lens 2 has a zoom ratio of 2.7 times.

The zoom lens 2 has fourteen lenses, and includes, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a negative refractive power.

In the zoom lens 2, during zooming from a wide-angle end state in which a focal length is shortest to a telephoto end state in which a focal length is longest, air spacing between the first and second lens groups G1 and G2 increases, air spacing between the second and third lens groups G2 and G3 decreases, spacing between the third and fourth lens groups G3 and G4 changes, and spacing between the fourth and fifth lens groups G4 and G5 changes. Thus, all the lens groups are moved in an optical axis direction.

During zooming, the third lens group G3 and the fifth lens group G5 are integrally moved in the optical axis direction.

In the zoom lens 2, the fourth lens group G4 is set as a focus lens group that adjusts a focal point from an infinite distance to a close distance by moving in the optical axis direction during focusing.

The first lens group G1 is formed of a cemented lens. The cemented lens is formed by cementing a first lens L1 and a second lens L2. The first lens L1 has a meniscus shape convex toward the object side, and has a negative refractive power. The second lens L2 is positioned to be close to the image side of the first lens L1, has a meniscus shape convex toward the object side, and has a positive refractive power.

The second lens group G2 includes, in order from the object side to the image side: a third lens L3 that has a meniscus shape convex toward the object side and has a negative refractive power; a fourth lens L4 that has a biconcave shape and has a negative refractive power; and a fifth lens L5 that has a meniscus shape convex toward the object side and a positive refractive power.

The third lens group G3 includes, in order from the object side to the image side: a sixth lens L6 that has a meniscus shape convex toward the object side and has a positive refractive power; a seventh lens L7 that has a biconvex shape and has a positive refractive power; a cemented lens that is formed by cementing an eighth lens L8 having a biconcave shape and having a negative refractive power and a ninth lens L9 having a biconvex shape and a positive refractive power; and a tenth lens L10 that has a biconvex shape and a positive refractive power.

The fourth lens group G4 is formed of an eleventh lens L11 that has a meniscus shape convex toward the object side and a negative refractive power.

The fifth lens group G5 includes, in order from the object side to the image side: a cemented lens that is formed by cementing a twelfth lens L12, which has a meniscus shape concave toward the object side and has a positive refractive power, and a thirteenth lens L13 which has a biconcave shape and has a negative refractive power; and a fourteenth lens L14 that has a plano-concave shape concave toward the object side and has a negative refractive power.

An image plane IMG is disposed to be close to the image side of the fifth lens group G5.

An aperture stop STO is disposed between the second lens group G2 and the third lens group G3. The aperture stop STO is moved integrally with the third lens group G3 in the optical axis direction during zooming.

The seventh lens L7 of the third lens group G3 is set as a group for blur correction (blur correction lens), and is moved in the direction perpendicular to the optical axis direction at the time of blur correction.

Table 4 shows the lens data of Numerical Example 2 of the zoom lens 2, to which specific numerical values are applied, according to the second embodiment.

TABLE 4

| SURFACE NUMBER | Ri | di | ni | νi |
|---|---|---|---|---|
| 1 | 78.07 | 1.90 | 1.8467 | 23.78 |
| 2 | 63.15 | 8.62 | 1.6180 | 63.39 |
| 3 | 3540.43 | d4 | | |
| *4 | 110.93 | 1.20 | 1.8820 | 37.22 |
| *5 | 17.35 | 6.99 | | |
| 6 | −172.53 | 0.80 | 1.8042 | 46.50 |

TABLE 4-continued

| SURFACE NUMBER | Ri | di | ni | νi |
|---|---|---|---|---|
| 7 | 51.96 | 0.40 | | |
| 8 | 30.98 | 3.80 | 1.9229 | 20.88 |
| 9 | 597.12 | d9 | | |
| 10(STO) | ∞ | 1.50 | | |
| *11 | 29.41 | 1.74 | 1.8514 | 40.10 |
| *12 | 41.82 | 3.16 | | |
| 13 | 198.08 | 2.06 | 1.6935 | 53.20 |
| *14 | −85.80 | 1.91 | | |
| 15 | −92.26 | 0.95 | 1.7552 | 27.53 |
| 16 | 18.23 | 4.59 | 1.4970 | 81.61 |
| 17 | −47.16 | 4.41 | | |
| *18 | 68.20 | 5.17 | 1.7738 | 47.17 |
| *19 | −22.38 | d19 | | |
| *20 | 61.66 | 0.80 | 1.6968 | 55.46 |
| *21 | 23.05 | d21 | | |
| 22 | −183.84 | 2.26 | 1.7725 | 49.62 |
| 23 | −80.00 | 0.90 | 1.6584 | 50.85 |
| 24 | 125.88 | 2.36 | | |
| 25 | −66.46 | 1.00 | 1.4875 | 70.44 |
| 26 | ∞ | Bf | | |

(*: ASPHERIC SURFACE)

In the zoom lens 2, both surfaces (fourth and fifth surfaces) of the third lens L3 of the second lens group G2, both surfaces (eleventh and twelfth surfaces) of the sixth lens L6 of the third lens group G3, an image side surface (fourteenth surface) of the seventh lens L7 of the third lens group G3, both surfaces (eighteenth and nineteenth surfaces) of the tenth lens L10 of the third lens group G3, and both surfaces (twentieth and twenty-first surfaces) of the eleventh lens L11 of the fourth lens group G4 are formed as aspheric surfaces. Table 5 shows the 4th-order, 6th-order, 8th-order, and 10th-order aspheric surface coefficients C4, C6, C8, and C10 of the aspheric surfaces, together with the conic constant κ, in Numerical Example 2.

TABLE 5

| SURFACE NUMBER | κ | C4 | C6 | C8 | C10 |
|---|---|---|---|---|---|
| 4 | −8.058 | −5.70460E−08 | −6.52058E−09 | 7.91579E−12 | 4.79709E−15 |
| 5 | 0.000 | −2.00993E−06 | 8.30300E−09 | −1.61384E−10 | 6.77602E−14 |
| 11 | 0.000 | −7.33069E−06 | −4.02300E−07 | 6.10524E−09 | −2.95338E−11 |
| 12 | 0.000 | 1.02927E−05 | −4.65177E−07 | 8.48917E−09 | −4.18514E−11 |
| 14 | 0.000 | 1.86776E−06 | 9.22479E−08 | −1.77823E−09 | 1.00263E−11 |
| 18 | 0.000 | −1.60270E−05 | 3.97735E−08 | −4.30743E−10 | 2.22297E−12 |
| 19 | 0.000 | 4.01345E−06 | 2.99567E−08 | −5.57328E−10 | 2.22913E−12 |
| 20 | 0.000 | 5.74095E−06 | −4.23709E−09 | −8.91308E−10 | 2.95081E−12 |
| 21 | 0.000 | 7.57849E−06 | −2.78686E−08 | −7.64401E−10 | 2.60881E−12 |

Table 6 shows, together with the variable spacing, the focal length f of the whole lens system, the open f number Fno, and the half angle of view ω, in Numerical Example 2.

TABLE 6

| | WIDE-ANGLE END | MIDDLE | TELEPHOTO END |
|---|---|---|---|
| f | 24.73 | 46.25 | 67.91 |
| Fno | 4.68 | 4.68 | 4.68 |
| ω | 42.23 | 24.02 | 16.75 |
| d3 | 0.80 | 17.88 | 31.00 |
| d9 | 23.72 | 8.40 | 2.07 |
| d19 | 5.58 | 3.22 | 2.00 |
| d21 | 6.19 | 8.55 | 9.77 |
| Bf | 19.47 | 32.80 | 42.58 |

Figure 8:
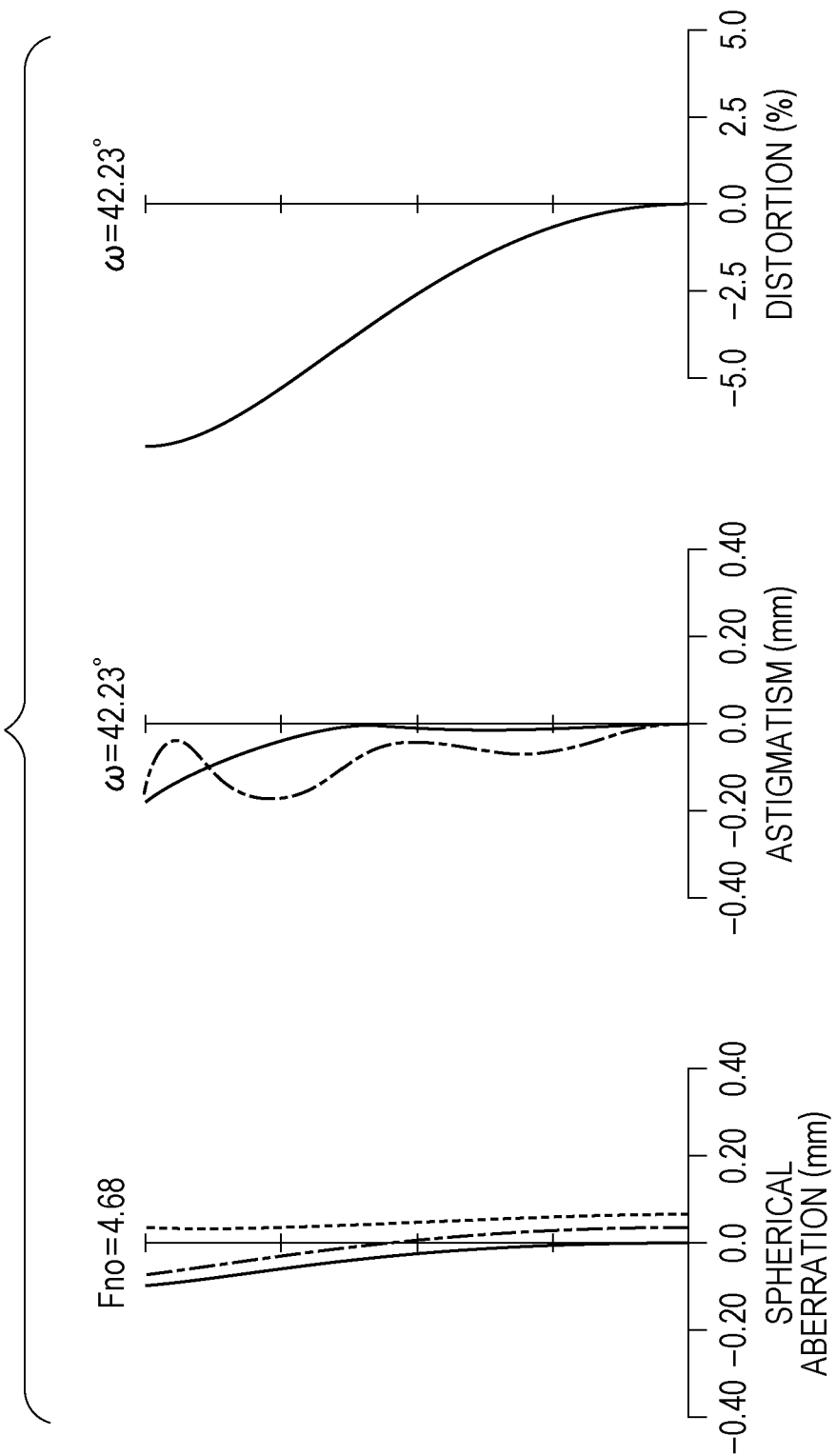
FIG. 8 is a diagram illustrating spherical aberration, astigmatism, and distortion at the wide-angle end in a numerical example in which specific numerical values are applied to the second embodiment.
Figure 9:
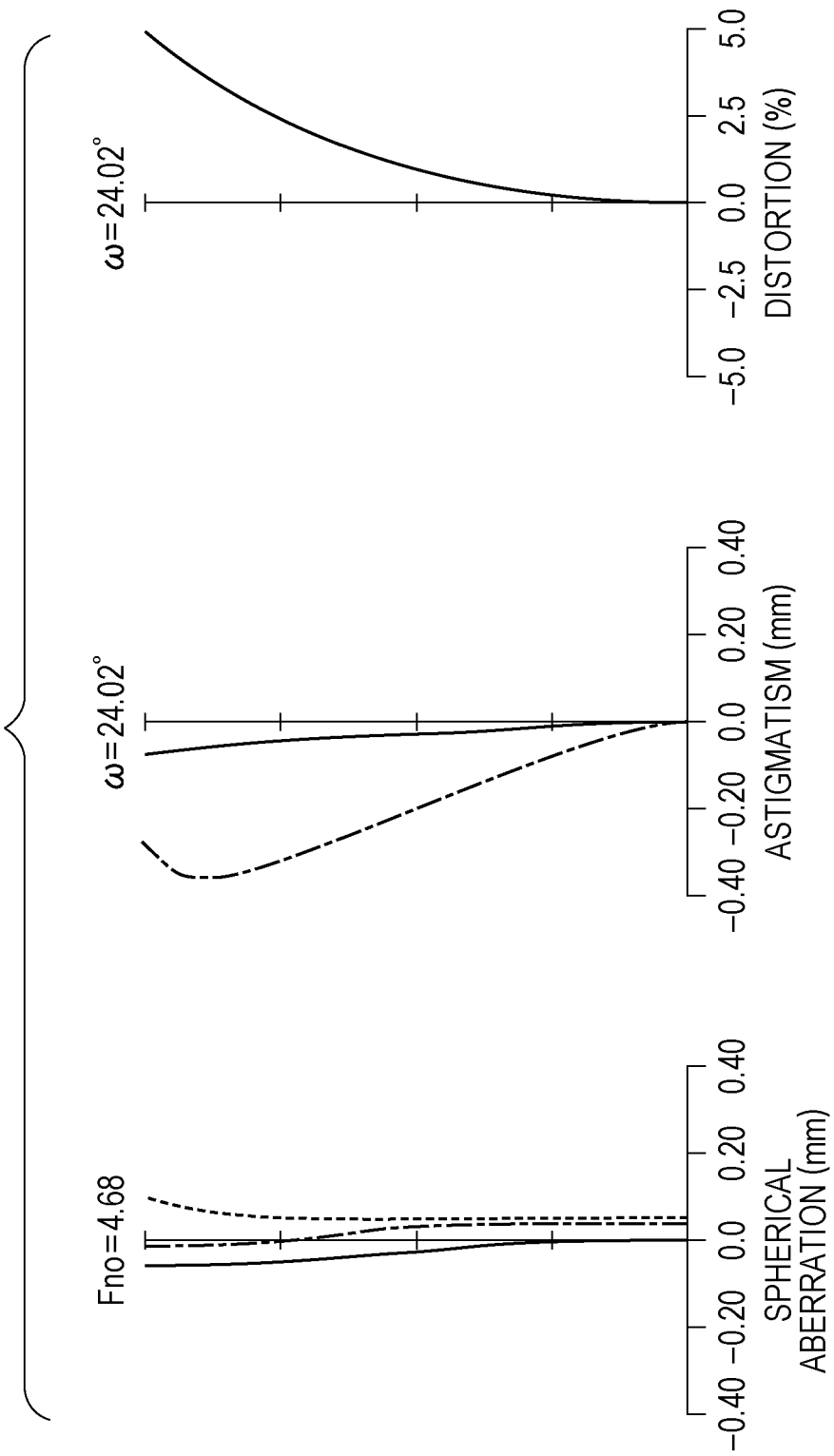
FIG. 9 is a diagram illustrating spherical aberration, astigmatism, and distortion at the middle focal length in the numerical example in which specific numerical values are applied to the second embodiment.
Figure 10:
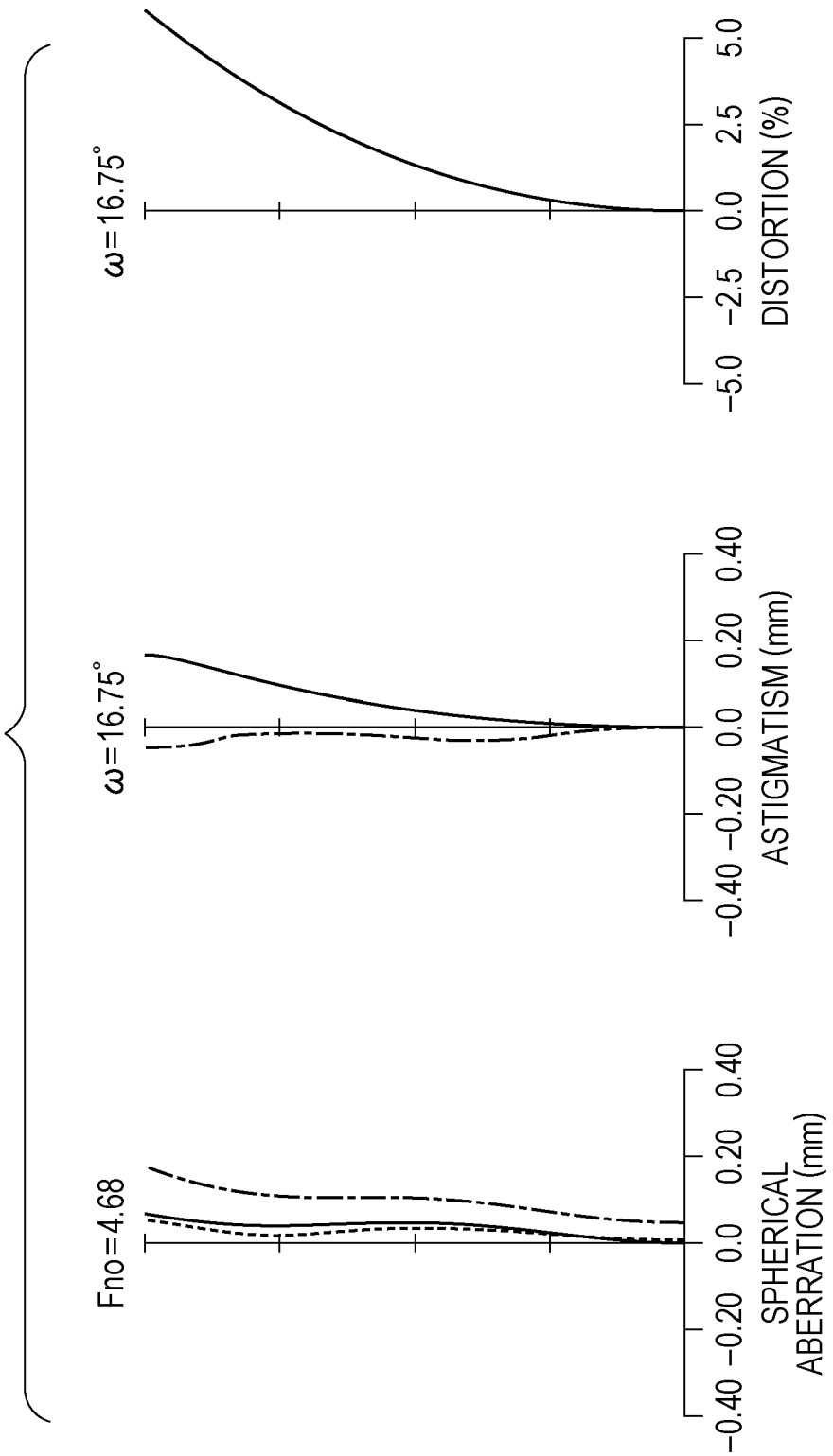
FIG. 10 is a diagram illustrating spherical aberration, astigmatism, and distortion at the telephoto end in the numerical example in which specific numerical values are applied to the second embodiment.

FIG. 8 shows spherical aberration, astigmatism, and distortion at the wide-angle end in Numerical Example 2. FIG. 9 shows spherical aberration, astigmatism, and distortion at the middle focal length in Numerical Example 2. FIG. 10 shows spherical aberration, astigmatism, and distortion at the telephoto end in Numerical Example 2.

In each spherical aberration diagram of FIGS. 8 to 10, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

Figure 11:
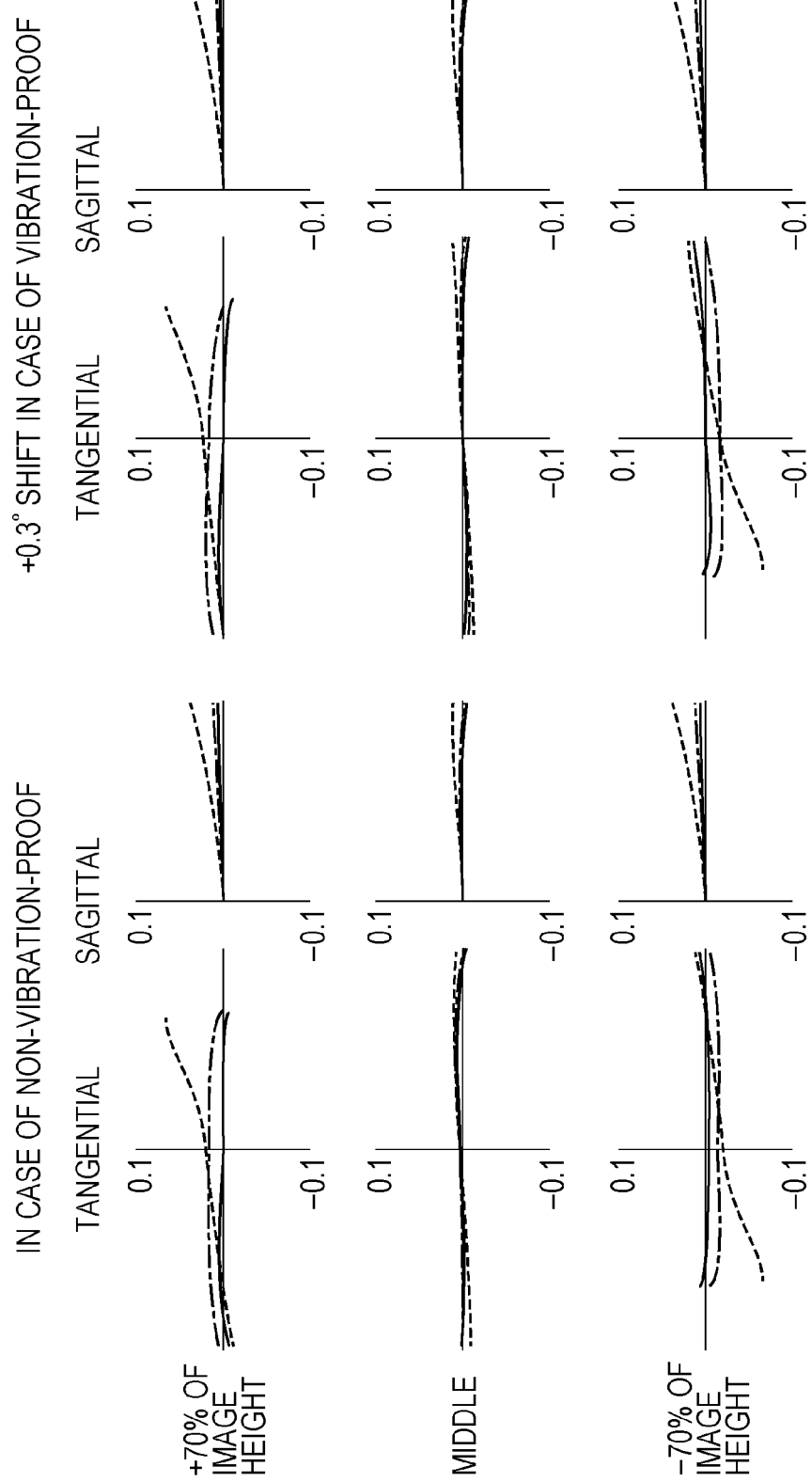
FIG. 11 is a diagram of lateral aberrations at the wide-angle end in the numerical example in which specific numerical values are applied to the second embodiment.
Figure 12:
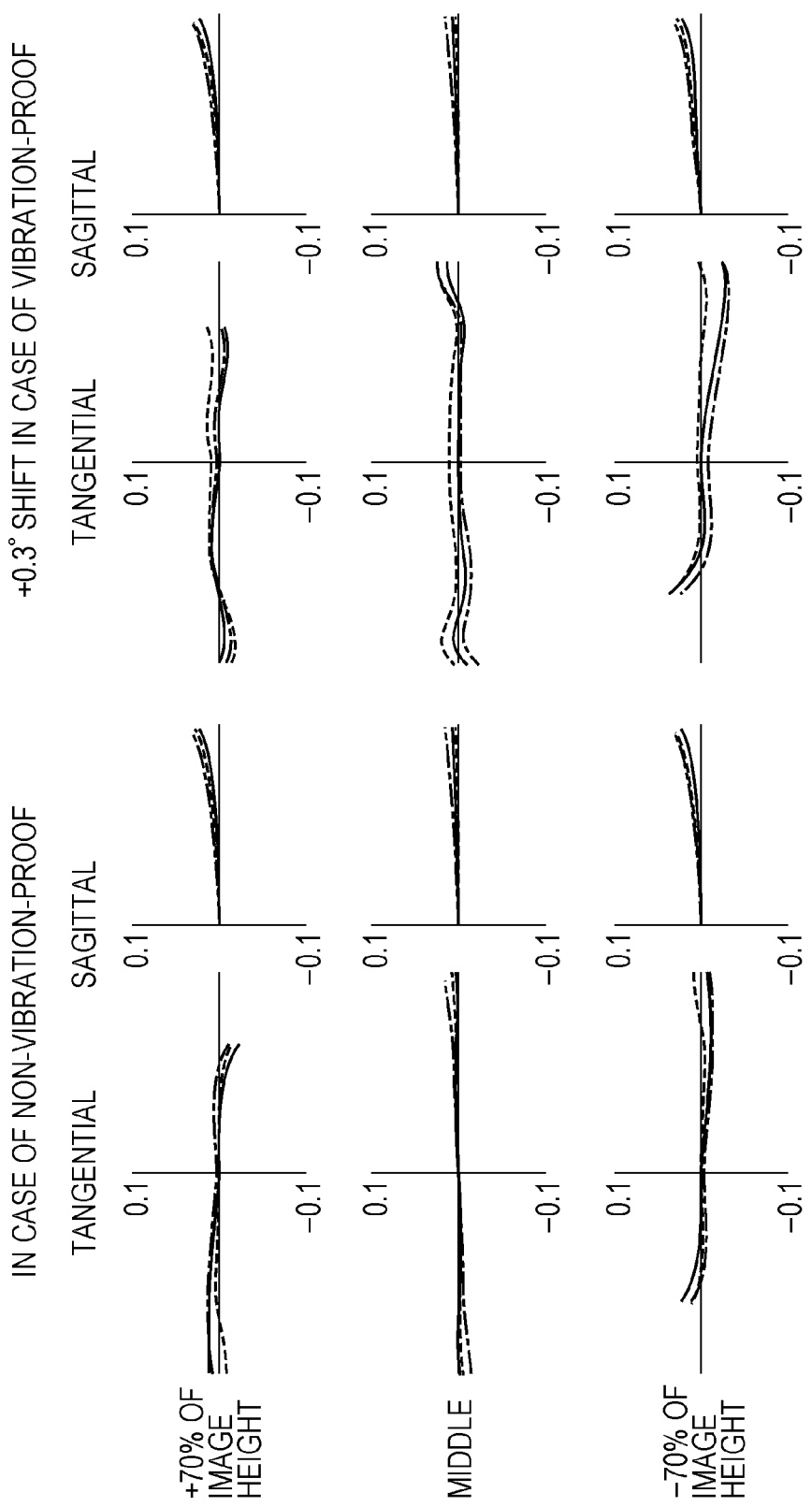
FIG. 12 is a diagram of lateral aberrations at the telephoto end in the numerical example in which specific numerical values are applied to the second embodiment.

FIG. 11 shows lateral aberrations in a case of non-vibration-proof (non-blur correction) and lateral aberrations in a case of shift of 0.3° and vibration-proof (blur correction) at the wide-angle end in Numerical Example 2. FIG. 12 shows lateral aberrations in a case of non-vibration-proof (non-blur correction) and lateral aberrations in a case of shift of 0.3° and vibration-proof (blur correction) at the telephoto end in Numerical Example 2.

In each of FIGS. 11 and 12, the left side indicates the meridional (tangential) image plane, the right side indicates the value of the sagittal image plane, the chain line indicates the value of the C-line, the solid line indicates the value of the d-line, and the dotted line indicates the value of the g-line.

As can be clearly seen from the aberration diagrams, in Numerical Example 2, it is possible to obtain excellent imaging performance by satisfactorily correcting various aberrations.

Third Embodiment

Figure 13:
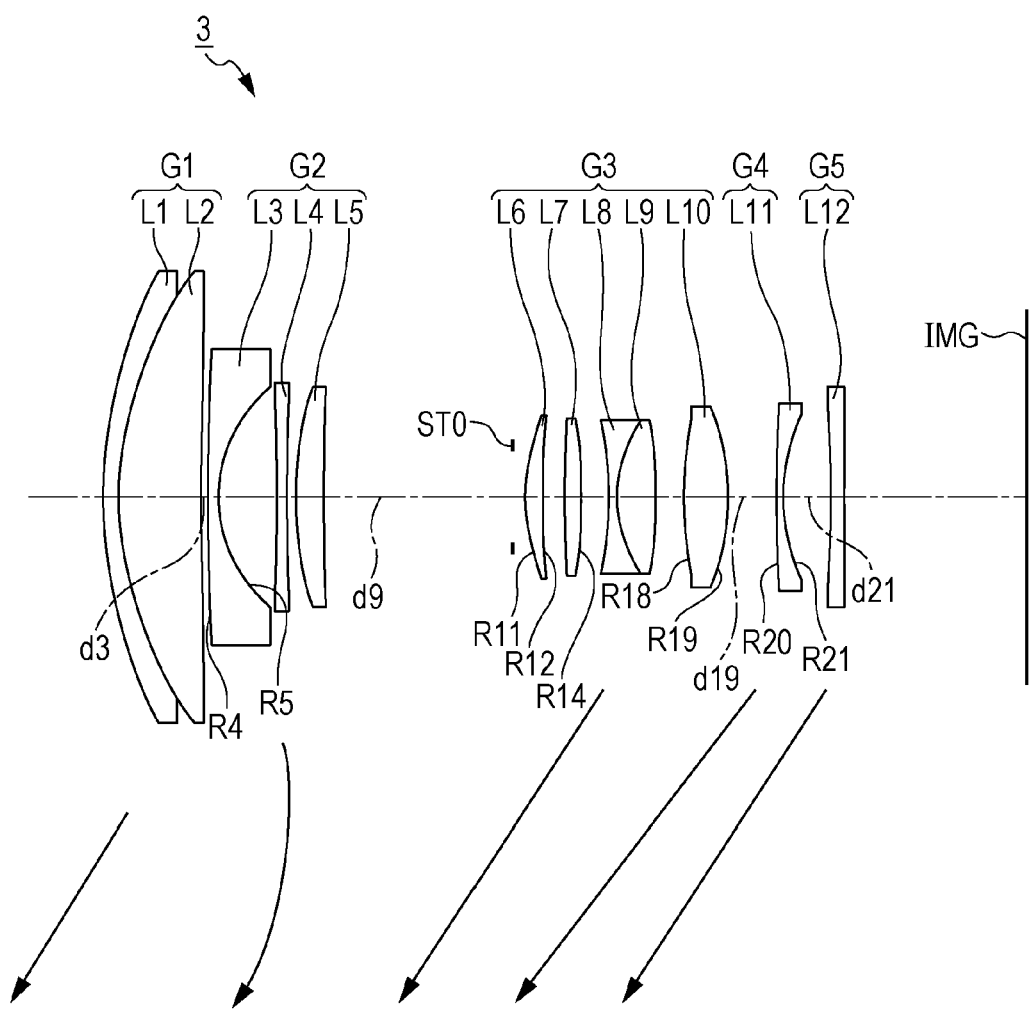
FIG. 13 is a diagram illustrating a lens configuration of a zoom lens according to a third embodiment.

FIG. 13 shows a lens configuration of a zoom lens 3 according to a third embodiment of the present technology.

The zoom lens 3 has a zoom ratio of 2.7 times.

The zoom lens 3 has twelve lenses, and includes, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a negative refractive power.

In the zoom lens 3, during zooming from a wide-angle end state in which a focal length is shortest to a telephoto end state in which a focal length is longest, air spacing between the first and second lens groups G1 and G2 increases, air spacing between the second and third lens groups G2 and G3 decreases, spacing between the third and fourth lens groups G3 and G4 changes, and spacing between the fourth and fifth lens groups G4 and G5 changes. Thus, all the lens groups are moved in an optical axis direction.

During zooming, the third lens group G3 and the fifth lens group G5 are integrally moved in the optical axis direction.

In the zoom lens 3, the fourth lens group G4 is set as a focus lens group that adjusts a focal point from an infinite distance to a close distance by moving in the optical axis direction during focusing.

The first lens group G1 is formed of a cemented lens. The cemented lens is formed by cementing a first lens L1 and a second lens L2. The first lens L1 has a meniscus shape convex toward the object side, and has a negative refractive power. The second lens L2 is positioned to be close to the image side of the first lens L1, has a meniscus shape convex toward the object side, and has a positive refractive power.

The second lens group G2 includes, in order from the object side to the image side: a third lens L3 that has a meniscus shape convex toward the object side and has a negative refractive power; a fourth lens L4 that has a biconcave shape and has a negative refractive power; and a fifth lens L5 that has a meniscus shape convex toward the object side and a positive refractive power.

The third lens group G3 includes, in order from the object side to the image side: a sixth lens L6 that has a meniscus shape convex toward the object side and has a positive refractive power; a seventh lens L7 that has a biconvex shape and has a positive refractive power; a cemented lens that is formed by cementing an eighth lens L8 having a biconcave shape and having a negative refractive power and a ninth lens L9 having a biconvex shape and a positive refractive power; and a tenth lens L10 that has a biconvex shape and a positive refractive power.

The fourth lens group G4 is formed of an eleventh lens L11 that has a meniscus shape convex toward the object side and a negative refractive power.

The fifth lens group G5 is formed of a twelfth lens L12 that has a plano-concave shape concave toward the object side and has a negative refractive power.

An image plane IMG is disposed to be close to the image side of the fifth lens group G5.

An aperture stop STO is disposed between the second lens group G2 and the third lens group G3. The aperture stop STO is moved integrally with the third lens group G3 in the optical axis direction during zooming.

The seventh lens L7 of the third lens group G3 is set as a group for blur correction (blur correction lens), and is moved in the direction perpendicular to the optical axis direction at the time of blur correction.

Table 7 shows the lens data of Numerical Example 3 of the zoom lens 3, to which specific numerical values are applied, according to the third embodiment.

TABLE 7

| SURFACE NUMBER | Ri | di | ni | νi |
|---|---|---|---|---|
| 1 | 57.18 | 1.90 | 1.84666 | 23.78 |
| 2 | 44.43 | 9.83 | 1.618 | 63.39 |
| 3 | 820.41 | d3 | | |
| *4 | 373.87 | 1.20 | 1.88202 | 37.22 |
| *5 | 16.47 | 7.88 | | |
| 6 | −79.42 | 0.80 | 1.7725 | 49.62 |
| 7 | 557.23 | 0.40 | | |
| 8 | 38.58 | 3.80 | 1.94595 | 17.98 |
| 9 | 260.63 | d9 | | |
| 10(STO) | ∞ | 1.50 | | |
| *11 | 24.33 | 2.18 | 1.88202 | 37.22 |
| *12 | 60.38 | 2.84 | | |
| 13 | 286.45 | 1.74 | 1.7725 | 49.47 |
| *14 | −80.58 | 3.40 | | |
| 15 | −38.17 | 0.90 | 1.7552 | 27.53 |
| 16 | 15.33 | 4.73 | 1.497 | 81.61 |
| 17 | −47.62 | 3.36 | | |
| *18 | 38.52 | 5.32 | 1.73077 | 40.5 |
| *19 | −27.97 | d19 | | |
| *20 | 134.26 | 0.80 | 1.7725 | 49.47 |
| *21 | 24.50 | d21 | | |
| 22 | −600.62 | 2.00 | 1.48749 | 70.44 |
| 23 | ∞ | BF | | |

(*: ASPHERIC SURFACE)

In the zoom lens 3, both surfaces (fourth and fifth surfaces) of the third lens L3 of the second lens group G2, both surfaces (eleventh and twelfth surfaces) of the sixth lens L6 of the third lens group G3, an image side surface (fourteenth surface) of the seventh lens L7 of the third lens group G3, both surfaces (eighteenth and nineteenth surfaces) of the tenth lens L10 of the third lens group G3, and both surfaces (twentieth and twenty-first surfaces) of the eleventh lens L11 of the fourth lens group G4 are formed as aspheric surfaces. Table 8 shows the 4th-order, 6th-order, 8th-order, and 10th-order aspheric surface coefficients C4, C6, C8, and C10 of the aspheric surfaces, together with the conic constant κ, in Numerical Example 3.

TABLE 8

| SURFACE NUMBER | κ | C4 | C6 | C8 | C10 |
|---|---|---|---|---|---|
| 4 | 9.399 | 5.0545E−06 | −1.9085E−08 | 1.4671E−11 | 1.2449E−14 |
| 5 | 0.000 | −2.6430E−06 | 6.2786E−09 | −1.4840E−10 | −9.8534E−13 |
| 11 | 0.000 | −1.7333E−06 | −4.3031E−07 | 5.3145E−09 | −1.9092E−11 |
| 12 | 0.000 | 1.3809E−06 | −5.7456E−07 | 7.7232E−09 | −3.1256E−11 |
| 14 | 0.000 | −6.4561E−07 | 1.9499E−07 | −3.0532E−09 | 1.6155E−11 |
| 18 | 0.000 | −2.0025E−05 | 6.1888E−08 | −7.0364E−10 | 4.4094E−13 |
| 19 | 0.000 | 1.5915E−06 | 5.6216E−08 | −1.0189E−09 | 1.1571E−12 |
| 20 | 0.000 | −2.7694E−06 | 1.7991E−07 | −3.2400E−09 | 1.3050E−11 |
| 21 | 0.000 | −3.7192E−06 | 1.0869E−07 | −2.4497E−09 | 1.0090E−11 |

Table 9 shows, together with the variable spacing, the focal length f of the whole lens system, the open f number Fno, and the half angle of view ω, in Numerical Example 3.

TABLE 9

|     | WIDE-ANGLE END | MIDDLE | TELEPHOTO END |
| --- | --- | --- | --- |
| f   | 24.72 | 47.00 | 67.90 |
| Fno | 4.10 | 4.10 | 4.10 |
| ω   | 42.42 | 23.61 | 6.70 |
| d3  | 0.80 | 15.69 | 26.16 |
| d9  | 22.44 | 7.35 | 2.16 |
| d19 | 5.86 | 3.59 | 2.00 |
| d21 | 5.58 | 7.84 | 9.44 |
| Bf  | 21.95 | 35.79 | 45.74 |

Figure 14:
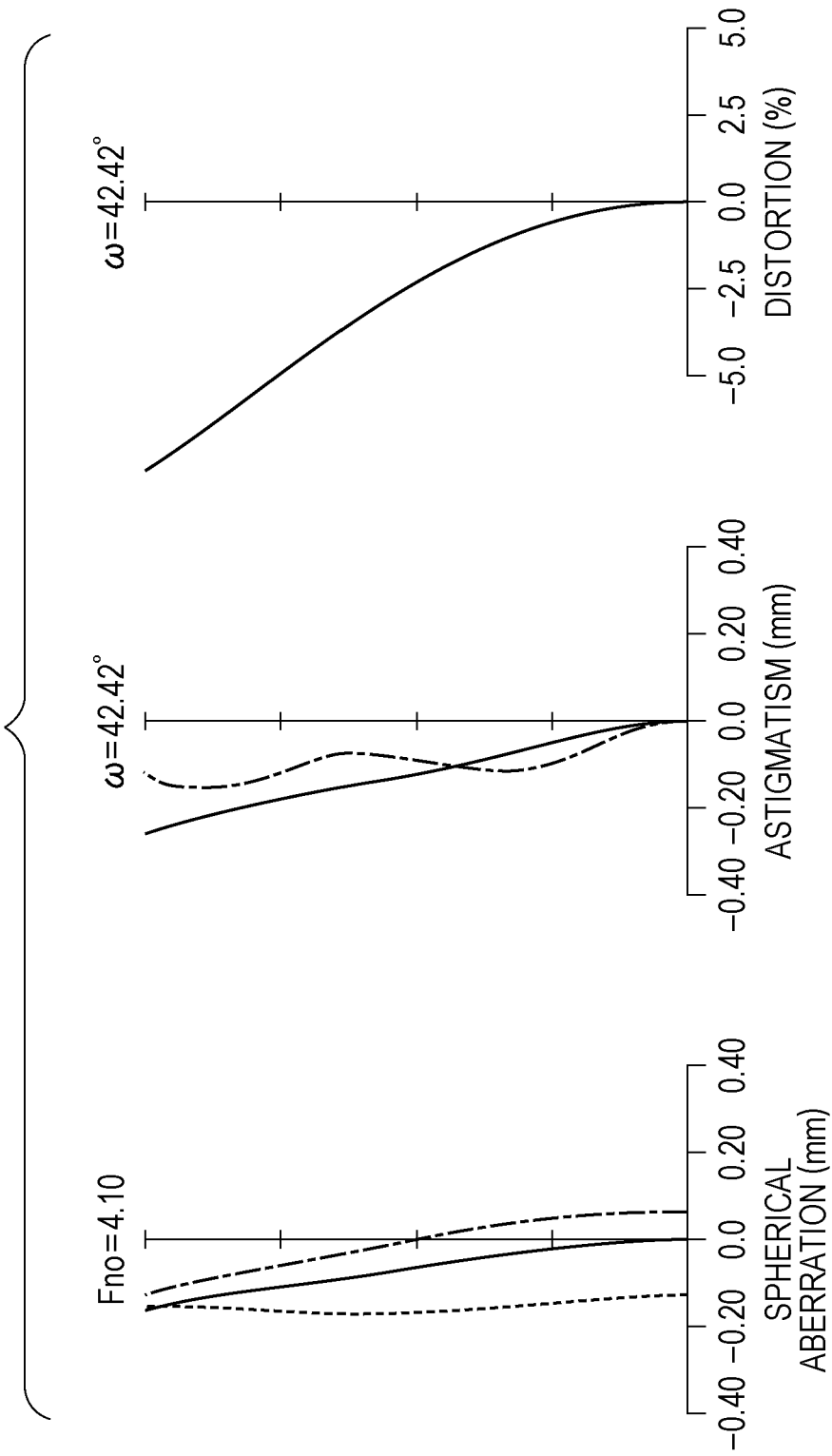
FIG. 14 is a diagram illustrating spherical aberration, astigmatism, and distortion at the wide-angle end in a numerical example in which specific numerical values are applied to the third embodiment.
Figure 15:
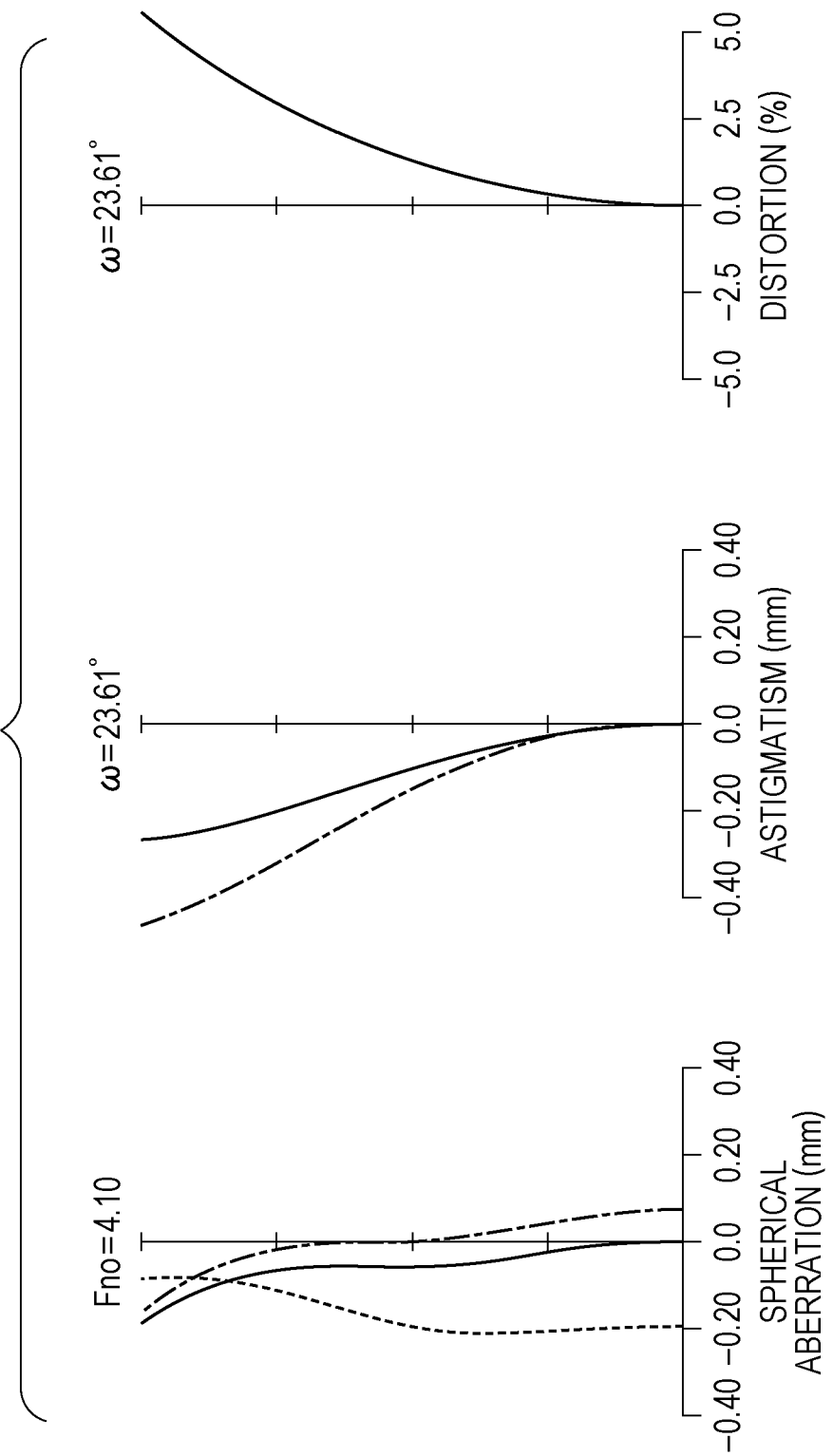
FIG. 15 is a diagram illustrating spherical aberration, astigmatism, and distortion at the middle focal length in the numerical example in which specific numerical values are applied to the third embodiment.
Figure 16:
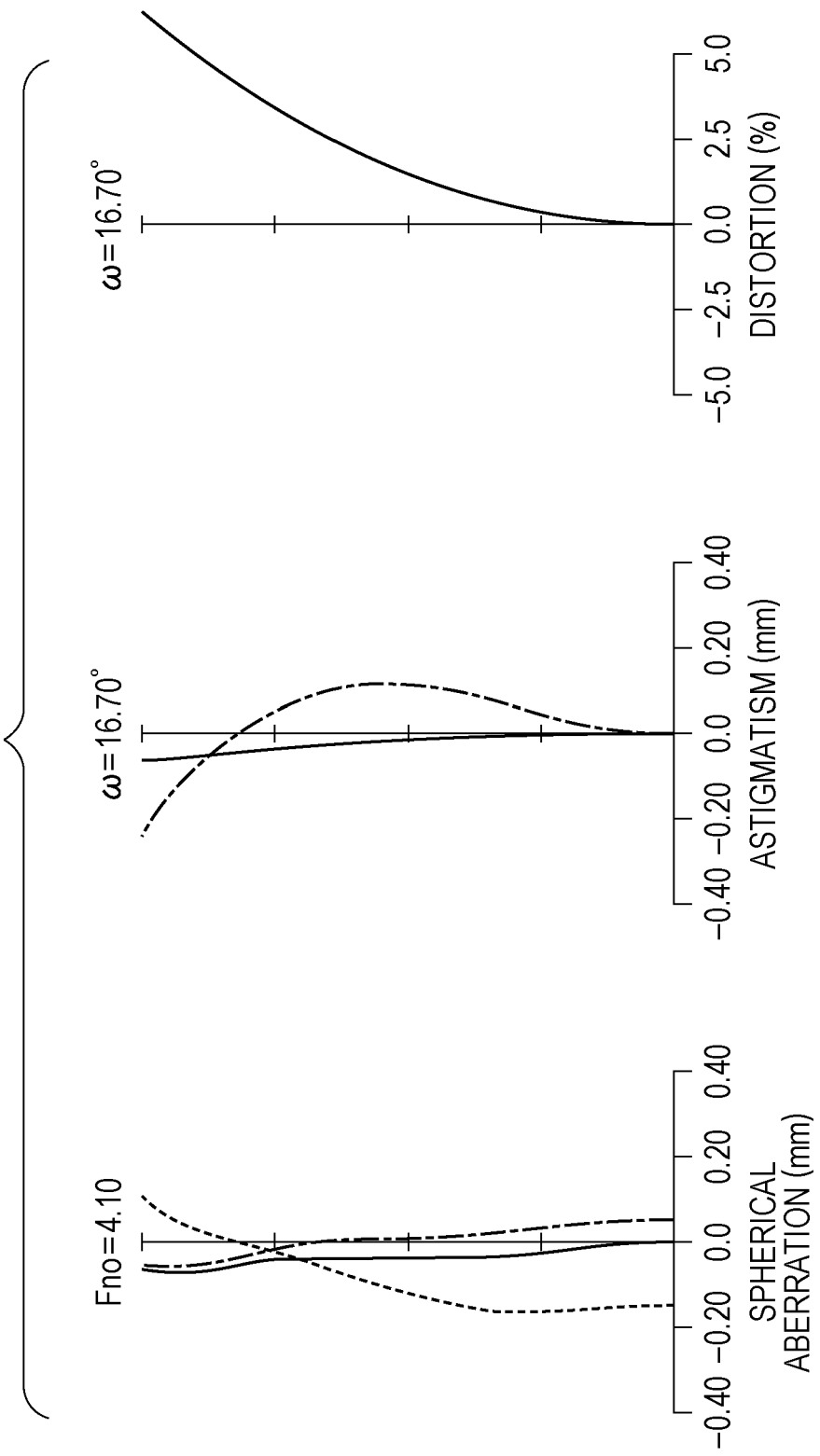
FIG. 16 is a diagram illustrating spherical aberration, astigmatism, and distortion at the telephoto end in the numerical example in which specific numerical values are applied to the third embodiment.

FIG. 14 shows spherical aberration, astigmatism, and distortion at the wide-angle end in Numerical Example 3. FIG. 15 shows spherical aberration, astigmatism, and distortion at the middle focal length in Numerical Example 3. FIG. 16 shows spherical aberration, astigmatism, and distortion at the telephoto end in Numerical Example 3.

In each spherical aberration diagram of FIGS. 14 to 16, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

Figure 17:
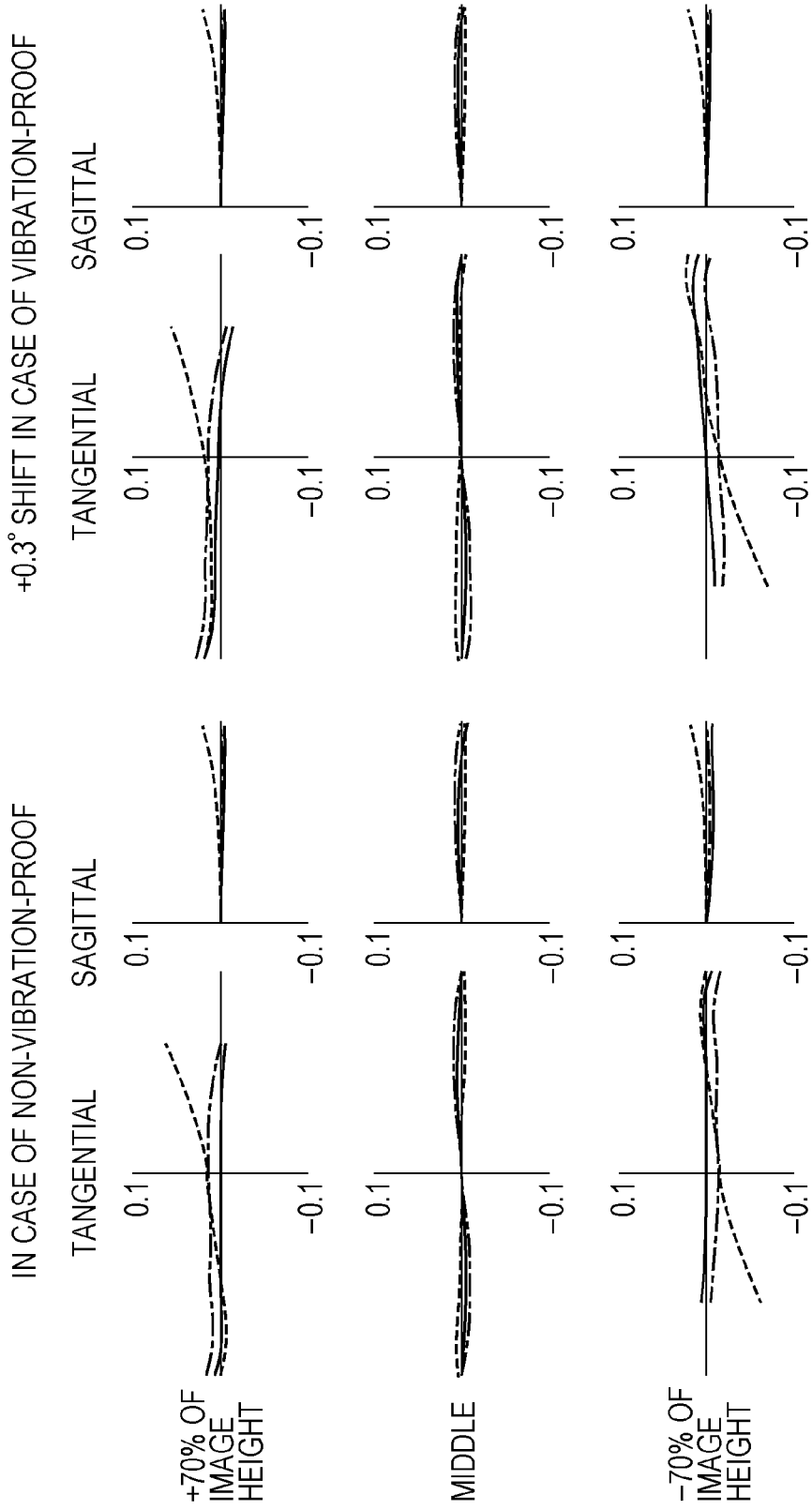
FIG. 17 is a diagram of lateral aberrations at the wide-angle end in the numerical example in which specific numerical values are applied to the third embodiment.
Figure 18:
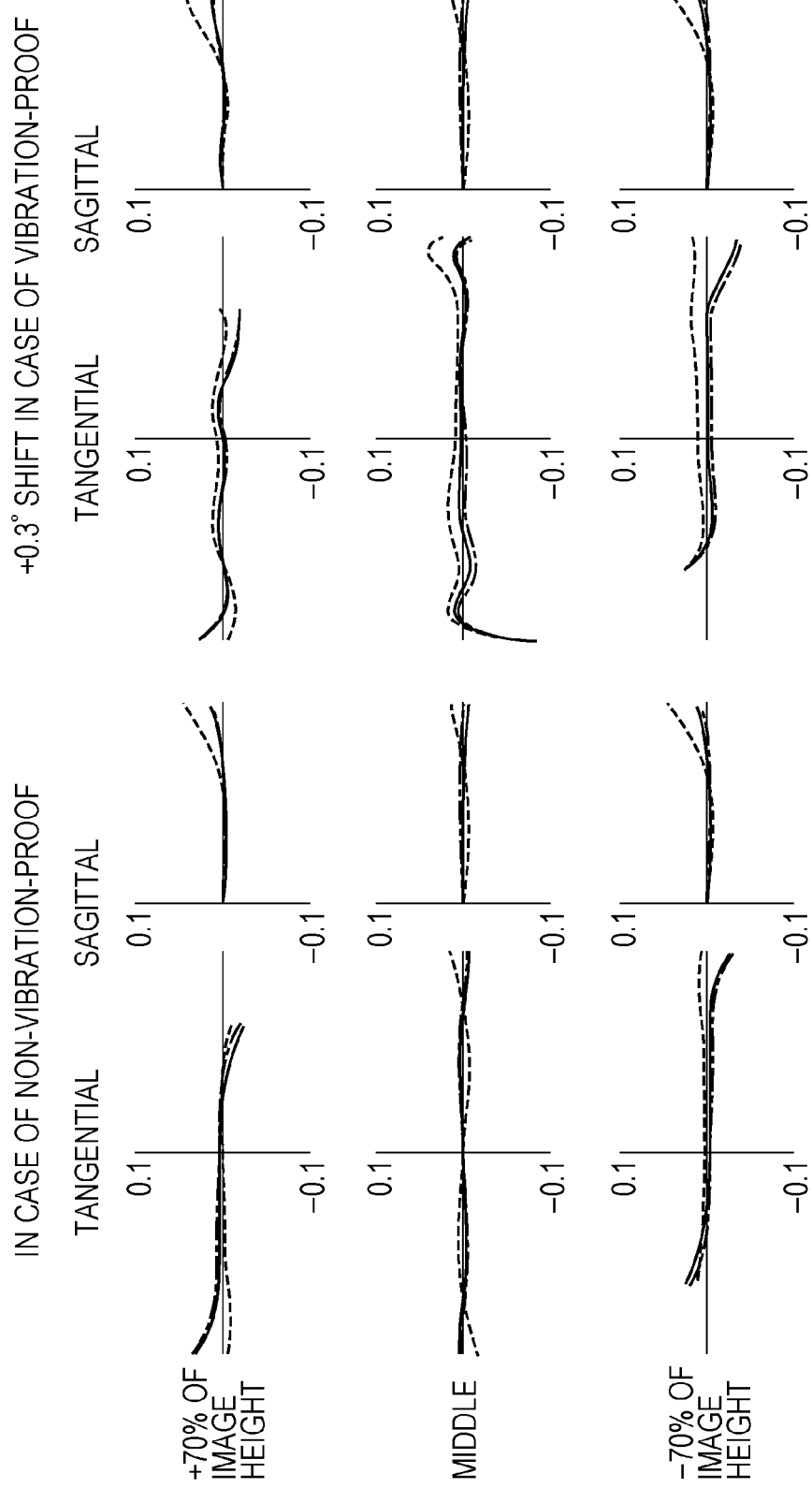
FIG. 18 is a diagram of lateral aberrations at the telephoto end in the numerical example in which specific numerical values are applied to the third embodiment.

FIG. 17 shows lateral aberrations in a case of non-vibration-proof (non-blur correction) and lateral aberrations in a case of shift of 0.3° and vibration-proof (blur correction) at the wide-angle end in Numerical Example 3. FIG. 18 shows lateral aberrations in a case of non-vibration-proof (non-blur correction) and lateral aberrations in a case of shift of 0.3° and vibration-proof (blur correction) at the telephoto end in Numerical Example 3.

In each of FIGS. 17 and 18, the left side indicates the meridional (tangential) image plane, the right side indicates the value of the sagittal image plane, the chain line indicates the value of the C-line, the solid line indicates the value of the d-line, and the dotted line indicates the value of the g-line.

As can be clearly seen from the aberration diagrams, in Numerical Example 3, it is possible to obtain excellent imaging performance by satisfactorily correcting various aberrations.

Respective Values of Conditional Expressions of Zoom Lenses

Hereinafter, respective values of conditional expressions of the zoom lenses according to the present technology will be described.

Table 10 shows the respective values of Conditional Expressions (1) to (3) in Numerical Examples 1 to 3 of the zoom lenses 1 to 3.

TABLE 10

| CONDITIONAL EXPRESSION | EXAMPLE 1 | EXAMPLE 2 | EXAMPLE 3 |
| --- | --- | --- | --- |
| (1) $1.0 < \beta 5w \leq 4.0$ | 1.153 | 1.340 | 1.019 |
| (2) $0.7 < (R4f + R4r)/(R4f - R4r) \leq 3.0$ | 1.735 | 2.194 | 1.446 |
| (3) $1.018 < \beta 5w \leq 4.0$ | 1.153 | 1.340 | 1.019 |

As can be seen from Table 10, the zoom lenses 1 to 3 are configured to satisfy Conditional Expressions (1) to (3).

Configuration of Imaging Apparatus

In an imaging apparatus according to the present technology, the zoom lens includes, in order from an object side to an image side: a first lens group that has a positive refractive power; a second lens group that has a negative refractive power; a third lens group that has a positive refractive power; a fourth lens group that has a negative refractive power; and a fifth lens group that has a negative refractive power.

As described above, in the imaging apparatus according to the present technology, the zoom lens is configured such that the fifth lens group has a negative refractive power. Hence, the negative refractive power of the fifth lens group raises heights of off-axis rays transmitted through the fifth lens group up to the high image height. As a result, by minimizing the diameter of the entire optical system including the fifth lens group, the zoom lens is compatible with a large-size imaging device while having a small size.

Since the diameter of the entire optical system is minimized, the size of the focus lens group can also be reduced, and the height of rays passing through the focus lens group decreases. Hence, occurrence of aberrations is suppressed, and the focus lens group can be formed of a smaller number of lenses. Accordingly, it is possible to perform focusing at a high speed appropriate for capturing a moving image.

In the zoom lens of the imaging apparatus according to the present technology, during zooming from a wide-angle end state in which a focal length is shortest to a telephoto end state in which a focal length is longest, air spacing between the first and second lens groups increases, air spacing between the second and third lens groups decreases, spacing between the third and fourth lens groups changes, and spacing between the fourth and fifth lens groups changes. Thus, all the lens groups are moved in an optical axis direction.

In the imaging apparatus according to the present technology, the zoom lens satisfies the following Conditional Expression (1).

$$1.0 < \beta 5w \leq 4.0, \quad (1)$$

where β5w is a lateral magnification of the fifth lens group at a wide-angle end.

Conditional Expression (1) defines an appropriate range of the magnification of the fifth lens group at the wide-angle end.

When the result of Conditional Expression (1) is greater than the upper limit thereof, it is difficult to correct aberrations occurring in the fifth lens group or satisfy restriction in the back focal length of the interchangeable lens. Further, the angle of incidence of the exit light of the optical system incident onto the image plane increases, and is thus inappropriate for the directivity of the light receiving portion of the imaging device.

In contrast, when the result of Conditional Expression (1) is less than the lower limit thereof, the lateral magnification is less than 1. Thus, the effect of raising the heights of the off-axis rays is lost.

Accordingly, by making the zoom lens satisfy Conditional Expression (1), it is possible to correct aberrations occurring in the fifth lens group or satisfy the restriction in the back focal length of the interchangeable lens. Further, the angle of incidence of the exit light of the optical system incident onto the image plane decreases. Thus, it is possible to secure favorable compatibility with the directivity of the light receiving portion of the imaging device, and it is also possible to secure high imaging performance.

In order to obtain better optical performance, it is preferable that the zoom lens satisfy the following Conditional Expression (1)'.

$$1.0 < \beta 5w \leq 3.0 \quad (1)'$$

By making the zoom lens satisfy Conditional Expression (1)', it is possible to correct aberrations occurring in the fifth lens group or sufficiently satisfy the restriction in the back focal length of the interchangeable lens. Further, the angle of incidence of the exit light of the optical system incident onto the image plane decreases. Thus, it is possible to secure better compatibility with the directivity of the light receiving portion of the imaging device.

Further, in order to obtain still better optical performance, it is preferable that the zoom lens satisfy the following Conditional Expression (1)".

$$1.0 < \beta 5w \leq 2.0 \quad (1)''$$

By making the zoom lens satisfy Conditional Expression (1)", it is possible to correct aberrations occurring in the fifth lens group or more sufficiently satisfy the restriction in the back focal length of the interchangeable lens. Further, the angle of incidence of the exit light of the optical system incident onto the image plane decreases. Thus, it is possible to secure still better compatibility with the directivity of the light receiving portion of the imaging device.

In order to obtain still better optical performance, it is preferable that the zoom lens satisfy the following Conditional Expression (1)'''.

$$1.018 < \beta 5w \leq 1.5 \quad (1)'''$$

By making the zoom lens satisfy Conditional Expression (1)''', it is possible to correct aberrations occurring in the fifth lens group or further more sufficiently satisfy the restriction in the back focal length of the interchangeable lens. Further, the angle of incidence of the exit light of the optical system incident onto the image plane decreases. Thus, it is possible to secure the best compatibility with the directivity of the light receiving portion of the imaging device.

Configuration of Different Imaging Apparatus

In a different imaging apparatus according to the present technology, a zoom lens includes, in order from an object side to an image side: a first lens group that has a positive refractive power; a second lens group that has a negative refractive power; a third lens group that has a positive refractive power; a fourth lens group that has a negative refractive power; and a fifth lens group that has a negative refractive power.

As described above, in the different imaging apparatus according to the present technology, the zoom lens is configured such that the fifth lens group has a negative refractive power. Hence, the negative refractive power of the fifth lens group raises heights of off-axis rays transmitted through the fifth lens group up to the high image height. As a result, by minimizing the diameter of the entire optical system including the fifth lens group, the zoom lens is compatible with a large-size imaging device while having a small size.

Since the diameter of the entire optical system is minimized, the size of the focus lens group can also be reduced, and the height of rays passing through the focus lens group decreases. Hence, occurrence of aberrations is suppressed, and the focus lens group can be formed of a smaller number of lenses. Accordingly, it is possible to perform focusing at a high speed appropriate for capturing a moving image.

In the zoom lens of the different imaging apparatus according to the present technology, during zooming from a wide-angle end state in which a focal length is shortest to a telephoto end state in which a focal length is longest, air spacing between the first and second lens groups increases, air spacing between the second and third lens groups decreases, and spacing between the third and fourth lens groups changes. Thus, all the lens groups are moved in an optical axis direction.

The different zoom lens according to the present technology satisfies the following Conditional Expression (3).

$$1.018 < \beta 5w \leq 4.0, \quad (3)$$

where $\beta 5w$ is a lateral magnification of the fifth lens group at a wide-angle end.

Conditional Expression (3) defines an appropriate range of the magnification of the fifth lens group at the wide-angle end.

When the result of Conditional Expression (3) is greater than the upper limit thereof, it is difficult to correct aberrations occurring in the fifth lens group or satisfy restriction in the back focal length of the interchangeable lens. Further, the angle of incidence of the exit light of the optical system incident onto the image plane increases, and is thus inappropriate for the directivity of the light receiving portion of the imaging device.

In contrast, when the result of Conditional Expression (3) is less than the lower limit thereof, the lateral magnification is less than 1.018. Thus, the effect of raising the heights of the off-axis rays is insufficient or is lost.

Accordingly, by making the zoom lens satisfy Conditional Expression (3), it is possible to correct aberrations occurring in the fifth lens group or satisfy the restriction in the back focal length of the interchangeable lens. Further, the angle of incidence of the exit light of the optical system incident onto the image plane decreases. Thus, it is possible to secure favorable compatibility with the directivity of the light receiving portion of the imaging device, and it is also possible to secure high imaging performance.

In order to obtain better optical performance, it is preferable that the zoom lens satisfy the following Conditional Expression (3)'.

$$1.018 < \beta 5w \leq 3.0 \quad (3)'$$

By making the zoom lens satisfy Conditional Expression (3)', it is possible to correct aberrations occurring in the fifth lens group or sufficiently satisfy the restriction in the back focal length of the interchangeable lens. Further, the angle of incidence of the exit light of the optical system incident onto the image plane decreases. Thus, it is possible to secure better compatibility with the directivity of the light receiving portion of the imaging device.

Further, in order to obtain still better optical performance, it is preferable that the zoom lens satisfy the following Conditional Expression (3)".

$$1.018 < \beta 5w \leq 2.0 \quad (3)''$$

By making the zoom lens satisfy Conditional Expression (3)", it is possible to correct aberrations occurring in the fifth lens group or more sufficiently satisfy the restriction in the back focal length of the interchangeable lens. Further, the angle of incidence of the exit light of the optical system incident onto the image plane decreases. Thus, it is possible to secure still better compatibility with the directivity of the light receiving portion of the imaging device.

In order to obtain still better optical performance, it is preferable that the zoom lens satisfy the following Conditional Expression (3)'''.

$$1.018 < \beta 5w \leq 1.5 \quad (3)'''$$

By making the zoom lens satisfy Conditional Expression (3)''', it is possible to correct aberrations occurring in the fifth lens group or further more sufficiently satisfy the restriction in the back focal length of the interchangeable lens. Further, the angle of incidence of the exit light of the optical system incident onto the image plane decreases. Thus, it is possible to secure the best compatibility with the directivity of the light receiving portion of the imaging device.

Embodiment of Imaging Apparatus

FIG. 19 shows a block diagram of a digital still camera as the imaging apparatus according to an embodiment of the present technology.

The imaging apparatus (digital still camera) 100 includes: a camera block 10 that has a function of capturing an image; a camera signal processing section 20 that performs a signal processing such as an analog-to-digital conversion processing on a captured-image signal; and an image processing section 30 that performs a process of recording and reproducing the image signal. Further, the imaging apparatus 100 includes: a display section such as a liquid crystal display (LCD) 40 that displays the taken image and the like; a reader/writer (R/W) 50 that writes and reads image signals in the memory card 1000; a central processing unit (CPU) 60 that controls the entire imaging apparatus 100; an input section 70, such as various switches, that is used for a user's operation input; and a lens driving control section 80 that controls driving of the lens within the camera block 10.

The camera block 10 includes: an optical system including the zoom lens 11 (one of the zoom lenses 1 to 3 according to the embodiment of the present technology); and an imaging device 12 such as a charge coupled device (CCD) sensor, a complementary metal oxide semiconductor (CMOS) sensor or the like.

The camera signal processing section 20 is configured to perform various signal processes, such as a process of conversion into a digital signal, noise removal, image quality correction, and a process of conversion into luminance and chromatic difference signals, on the output signal which is output from the imaging device 12.

The image processing section 30 is configured to perform a process of encoding for compression and decoding for decompression on an image signal based on a predetermined image data format, a process of conversion of data specification such as resolution, and the like.

The display section 40 has a function of displaying various data such as a condition of the operation performed by a user with the aid of the input section 70 and a taken image.

The R/W 50 is configured to write image data, which is encoded by the image processing section 30, into the memory card 1000 and additionally read the image data which is recorded on the memory card 1000.

The CPU 60 functions as a control processing section to control all the circuit blocks within the imaging apparatus 100, and controls the circuit blocks on the basis of the instruction input signals and the like from the input section 70.

The input section 70 includes, for example, a shutter release button for performing a shutter operation, a selection switch for selecting operation modes, and the like. The input section 70 is configured to output the instruction input signal in response to the user's operation to the CPU 60.

The lens driving control section 80 is configured to control a motor, which is not shown in the drawing, for driving the lenses within the zoom lens 11 on the basis of the control signal from the CPU 60.

The memory card 1000 is, for example, a semiconductor memory which is removable from a slot connected to the R/W 50.

Next, operations of the imaging apparatus 100 will be described.

When the photographing is in standby, an image signal captured by the camera block 10 under the control of the CPU 60 is output to the display section 40 through the camera signal processing section 20 so as to be displayed as a camera live view image. Further, when the instruction input signal for zooming is input from the input section 70, the CPU 60 outputs a control signal to the lens driving control section 80, and moves predetermined lenses within the zoom lens 11 on the basis of the control of the lens driving control section 80.

When the not-shown shutter of the camera block 10 is operated by the instruction input signal from the input section 70, the captured image signal is output from the camera signal processing section 20 to the image processing section 30, is encoded for compression, and is converted into digital data of a predetermined data format. The converted data is output to the R/W 50 and is written in the memory card 1000.

For focusing, the lens driving control section 80 moves the predetermined lenses of the zoom lens 11 on the basis of the control signal received from the CPU 60, for example, when the shutter release button of the input section 70 is pressed halfway or pressed fully for recording (photography).

For reproduction of image data recorded in the memory card 1000, the R/W 50 reads out the prescribed image data from the memory card 1000 in response to the operation performed on the input section 70. The readout image data is decoded for decompression by the image processing section 30 and the reproduced image signal is then output to the display section 40, thereby displaying the reproduced image.

Others

In the imaging apparatus and the zoom lens according to the present technology, in addition to the first to fifth lens groups G1 to G5, another optical element such as a lens having no refractive power may be disposed. In this case, the lens configuration of the zoom lens according to the present technology is actually a configuration using five lens groups of the first to fifth lens groups G1 to G5.

Present Technology

The present technology is able to adopt the following configurations.

<1>

A zoom lens including, in order from an object side to an image side:

a first lens group that has a positive refractive power;

a second lens group that has a negative refractive power;

a third lens group that has a positive refractive power;

a fourth lens group that has a negative refractive power; and a fifth lens group that has a negative refractive power, in which during zooming from a wide-angle end state in which a focal length is shortest to a telephoto end state in which a focal length is longest, all the lens groups are moved in an optical axis direction such that air spacing between the first lens group and the second lens group increases, air spacing between the second lens group and the third lens group decreases, spacing between the third lens group and the fourth lens group changes, and spacing between the fourth lens group and the fifth lens group changes, and in which the following Conditional Expression (1) is satisfied.

$$1.0 < \beta 5w \le 4.0, \quad (1)$$

where $\beta 5w$ is a lateral magnification of the fifth lens group at a wide-angle end.

<2>

The zoom lens according to <1>, in which the fourth lens group satisfies the following Conditional Expression (2).

$$0.7 < (R4f + R4r)/(R4f - R4r) \le 3.0, \quad (2)$$

where

R4f is a radius of curvature of a surface of the fourth lens group closest to the object side, and R4r is a radius of curvature of a surface of the fourth lens group closest to the image side.

<3>

The zoom lens according to <1> or <2>, in which the fourth lens group is moved in the optical axis direction so as to correct a change in an image formation position caused by a change in an object distance.

<4>

The zoom lens according to any one of <1> to <3>, in which the fourth lens group is formed of one negative lens or one cemented lens.

<5>

The zoom lens according to any one of <1> to <4>, in which the third lens group and the fifth lens group are integrally moved in the optical axis direction during zooming.

<6>

The zoom lens according to any one of <1> to <5>, in which the fourth lens group has at least one aspheric surface.

<7>

The zoom lens according to any one of <1> to <6>, in which the third lens group is formed of a plurality of lenses, and in which some lenses of the third lens group are moved in a direction perpendicular to the optical axis direction so as to correct image blur.

<8>

The zoom lens according to <7>, in which some lenses of the third lens group, which are moved in the direction perpendicular to the optical axis direction, have at least one aspheric surface.

<9>

An imaging apparatus including:

a zoom lens; and an imaging device that converts an optical image, which is formed by the zoom lens, into an electric signal, in which the zoom lens includes, in order from an object side, a first lens group that has a positive refractive power, a second lens group that has a negative refractive power, a third lens group that has a positive refractive power, a fourth lens group that has a negative refractive power, and a fifth lens group that has a negative refractive power, in which during zooming from a wide-angle end state in which a focal length is shortest to a telephoto end state in which a focal length is longest, all the lens groups are moved in an optical axis direction such that air spacing between the first lens group and the second lens group increases, air spacing between the second lens group and the third lens group decreases, spacing between the third lens group and the fourth lens group changes, and spacing between the fourth lens group and the fifth lens group changes, and in which the following Conditional Expression (1) is satisfied.

$$1.0 < \beta 5w \leq 4.0, \qquad (1)$$

where $\beta 5w$ is a lateral magnification of the fifth lens group at a wide-angle end.

<10>

A zoom lens including, in order from an object side to an image side:

a first lens group that has a positive refractive power;

a second lens group that has a negative refractive power;

a third lens group that has a positive refractive power;

a fourth lens group that has a negative refractive power; and a fifth lens group that has a negative refractive power, in which during zooming from a wide-angle end state in which a focal length is shortest to a telephoto end state in which a focal length is longest, the lens groups are moved in an optical axis direction such that air spacing between the first lens group and the second lens group increases, air spacing between the second lens group and the third lens group decreases, and spacing between the third lens group and the fourth lens group changes, and in which the following Conditional Expression (3) is satisfied.

$$1.018 < \beta 5w \leq 4.0, \qquad (3)$$

where $\beta 5w$ is a lateral magnification of the fifth lens group at a wide-angle end.

<11>

An imaging apparatus including:

a zoom lens; and an imaging device that converts an optical image, which is formed by the zoom lens, into an electric signal, in which the zoom lens includes, in order from an object side, a first lens group that has a positive refractive power, a second lens group that has a negative refractive power, a third lens group that has a positive refractive power, a fourth lens group that has a negative refractive power, and a fifth lens group that has a negative refractive power, in which during zooming from a wide-angle end state in which a focal length is shortest to a telephoto end state in which a focal length is longest, the lens groups are moved in an optical axis direction such that air spacing between the first lens group and the second lens group increases, air spacing between the second lens group and the third lens group decreases, and spacing between the third lens group and the fourth lens group changes, and in which the following Conditional Expression (3) is satisfied.

$$1.018 < \beta 5w \leq 4.0, \qquad (3)$$

where $\beta 5w$ is a lateral magnification of the fifth lens group at a wide-angle end.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from an object side to an image side:

a first lens group that has a positive refractive power;

a second lens group that has a negative refractive power;

a third lens group that has a positive refractive power;

a fourth lens group that has a negative refractive power; and a fifth lens group that has a negative refractive power, wherein during zooming from a wide-angle end state in which a focal length is shortest to a telephoto end state in which a focal length is longest, all the lens groups are moved in an optical axis direction such that air spacing between the first lens group and the second lens group increases, air spacing between the second lens group and the third lens group decreases, spacing between the third lens group and the fourth lens group changes, and spacing between the fourth lens group and the fifth lens group changes, and wherein the following Conditional Expression (1) is satisfied:

$$1.0 < \beta 5w \leq 4.0, \qquad (1)$$

where $\beta 5w$ is a lateral magnification of the fifth lens group at a wide-angle end.

2. The zoom lens according to claim 1, wherein the fourth lens group satisfies the following Conditional Expression (2);

$$0.7 < (R4f+R4r)/(R4f-R4r) \leq 3.0, \quad (2)$$

where
R4f is a radius of curvature of a surface of the fourth lens group closest to the object side, and
R4r is a radius of curvature of a surface of the fourth lens group closest to the image side.

3. The zoom lens according to claim 1, wherein the fourth lens group is moved in the optical axis direction so as to correct a change in an image formation position caused by a change in an object distance.

4. The zoom lens according to claim 1, wherein the fourth lens group is formed of one negative lens or one cemented lens.

5. The zoom lens according to claim 1, wherein the third lens group and the fifth lens group are integrally moved in the optical axis direction during zooming.

6. The zoom lens according to claim 1, wherein the fourth lens group has at least one aspheric surface.

7. The zoom lens according to claim 1,
wherein the third lens group is formed of a plurality of lenses, and
wherein some lenses of the third lens group are moved in a direction perpendicular to the optical axis direction so as to correct image blur.

8. The zoom lens according to claim 7, wherein some lenses of the third lens group, which are moved in the direction perpendicular to the optical axis direction, have at least one aspheric surface.

9. An imaging apparatus comprising:
a zoom lens; and
an imaging device that converts an optical image, which is formed by the zoom lens, into an electric signal,
wherein the zoom lens includes, in order from an object side,
a first lens group that has a positive refractive power;
a second lens group that has a negative refractive power;
a third lens group that has a positive refractive power;
a fourth lens group that has a negative refractive power; and
a fifth lens group that has a negative refractive power,
wherein during zooming from a wide-angle end state in which a focal length is shortest to a telephoto end state in which a focal length is longest, all the lens groups are moved in an optical axis direction such that air spacing between the first lens group and the second lens group increases, air spacing between the second lens group and the third lens group decreases, spacing between the third lens group and the fourth lens group changes, and spacing between the fourth lens group and the fifth lens group changes, and
wherein the following Conditional Expression (1) is satisfied:

$$1.0 < \beta 5w \leq 4.0, \quad (1)$$

where $\beta 5w$ is a lateral magnification of the fifth lens group at a wide-angle end.

10. A zoom lens comprising, in order from an object side to an image side:
a first lens group that has a positive refractive power;
a second lens group that has a negative refractive power;
a third lens group that has a positive refractive power;
a fourth lens group that has a negative refractive power; and
a fifth lens group that has a negative refractive power,
wherein during zooming from a wide-angle end state in which a focal length is shortest to a telephoto end state in which a focal length is longest, the lens groups are moved in an optical axis direction such that air spacing between the first lens group and the second lens group increases, air spacing between the second lens group and the third lens group decreases, and spacing between the third lens group and the fourth lens group changes, and
wherein the following Conditional Expression (3) is satisfied:

$$1.018 < \beta 5w \leq 4.0, \quad (3)$$

where $\beta 5w$ is a lateral magnification of the fifth lens group at a wide-angle end.

11. An imaging apparatus comprising:
a zoom lens; and
an imaging device that converts an optical image, which is formed by the zoom lens, into an electric signal,
wherein the zoom lens includes, in order from an object side,
a first lens group that has a positive refractive power,
a second lens group that has a negative refractive power,
a third lens group that has a positive refractive power,
a fourth lens group that has a negative refractive power, and
a fifth lens group that has a negative refractive power,
wherein during zooming from a wide-angle end state in which a focal length is shortest to a telephoto end state in which a focal length is longest, the lens groups are moved in an optical axis direction such that air spacing between the first lens group and the second lens group increases, air spacing between the second lens group and the third lens group decreases, and spacing between the third lens group and the fourth lens group changes, and
wherein the following Conditional Expression (3) is satisfied:

$$1.018 < \beta 5w \leq 4.0, \quad (3)$$

where $\beta 5w$ is a lateral magnification of the fifth lens group at a wide-angle end.

* * * * *